US011965744B2

(12) United States Patent
Teng et al.

(10) Patent No.: US 11,965,744 B2
(45) Date of Patent: Apr. 23, 2024

(54) SYSTEMS AND METHODS FOR INDOOR POSITIONING

(71) Applicant: BEIJING DIDI INFINITY TECHNOLOGY AND DEVELOPMENT CO., LTD., Beijing (CN)

(72) Inventors: Xiaoqiang Teng, Beijing (CN); Rongzhi Wang, Beijing (CN); Jiankuan Li, Beijing (CN); Zhiwei Ruan, Beijing (CN); Zongyue Liu, Beijing (CN); Jun Zhang, Beijing (CN); Pengfei Xu, Beijing (CN); Shenggang Bao, Beijing (CN); Chao Liu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 130 days.

(21) Appl. No.: 17/093,753

(22) Filed: Nov. 10, 2020

(65) Prior Publication Data
US 2021/0055109 A1 Feb. 25, 2021

Related U.S. Application Data

(63) Continuation of application No. PCT/CN2019/089628, filed on May 31, 2019.

(30) Foreign Application Priority Data

Jun. 1, 2018 (CN) .......................... 201810554631.6
Jun. 7, 2018 (CN) .......................... 201810579130.3

(51) Int. Cl.
*G01C 21/12* (2006.01)
*G01C 21/16* (2006.01)
(Continued)

(52) U.S. Cl.
CPC ............ *G01C 21/206* (2013.01); *G01C 21/12* (2013.01); *G01C 21/1656* (2020.08); *G01C 21/3602* (2013.01); *G01C 21/3632* (2013.01)

(58) Field of Classification Search
CPC .......................... G01C 21/12; G01C 21/3602; G01C 21/3632; G01C 21/165; G01C 21/206; G06V 10/462
See application file for complete search history.

(56) References Cited

U.S. PATENT DOCUMENTS 9,294,873 B1 * 3/2016 MacGregor ........... H04W 4/026
2012/0176525 A1 * 7/2012 Garin .................. G01C 21/3652
348/333.02

(Continued)

FOREIGN PATENT DOCUMENTS

CN 102109348 A 6/2011
CN 104007460 A 8/2014
(Continued)

OTHER PUBLICATIONS

Machine Translation: WO-2018028649-A1 (Year: 2018).*
(Continued)

*Primary Examiner* — Anne Marie Antonucci
*Assistant Examiner* — Connor L Knight
(74) *Attorney, Agent, or Firm* — METIS IP LLC

(57) ABSTRACT

The present disclosure is related to systems and methods for indoor positioning. The method includes obtaining a first location of a subject at a first time point. The method also includes determining one or more motion parameters associated with the subject at least based on one or more sensors carried by the subject. The method further includes determining, based on the first location of the subject and the one or more motion parameters associated with the subject, a second location of the subject at a second time point after the
(Continued)

first time point. The method still further includes adjusting, at least based on surroundings information associated with the subject at the second time point, the second location of the subject to determine a target location of the subject.

20 Claims, 13 Drawing Sheets

(51) Int. Cl.
*G01C 21/20* (2006.01)
*G01C 21/36* (2006.01)
*G06K 9/46* (2006.01)

(56) References Cited

U.S. PATENT DOCUMENTS

| | | | | |
|---|---|---|---|---|
| 2012/0316784 | A1 | 12/2012 | Chrysanthakopoulos | |
| 2013/0166193 | A1* | 6/2013 | Goldman | G01C 21/165 |
| | | | | 701/445 |
| 2014/0172296 | A1* | 6/2014 | Shtukater | G01C 21/3647 |
| | | | | 701/408 |
| 2015/0281884 | A1* | 10/2015 | Smith | G01S 5/0263 |
| | | | | 455/456.3 |
| 2017/0245116 | A1* | 8/2017 | Chu | H04W 4/029 |
| 2018/0292216 | A1* | 10/2018 | Jimenez Gonzalez | |
| | | | | G01C 21/206 |
| 2022/0057226 | A1* | 2/2022 | Kimia | G06V 20/20 |

FOREIGN PATENT DOCUMENTS

| | | | | |
|---|---|---|---|---|
| CN | 104390643 | A | | 3/2015 |
| CN | 104931049 | A | | 9/2015 |
| CN | 105371847 | A | | 3/2016 |
| CN | 106595653 | A | | 4/2017 |
| CN | 106705967 | A | * | 5/2017 ............ G01C 21/18 |
| CN | 106840148 | A | | 6/2017 |
| CN | 106949892 | A | | 7/2017 |
| CN | 107356256 | A | | 11/2017 |
| CN | 107966151 | A | * | 4/2018 |
| CN | 107976187 | A | | 5/2018 |
| CN | 108010271 | A | | 5/2018 |
| CN | 108072370 | A | | 5/2018 |
| DE | 102015107555 | A1 | * | 11/2016 |
| KR | 101707878 | B1 | | 2/2017 |
| WO | WO-2018028649 | A1 | * | 2/2018 ............ G01C 21/20 |

OTHER PUBLICATIONS

Machine Translation: DE-102015107555-A1 (Year: 2016).*
Machine Translation: CN-107966151-A (Year: 2018).*
Machine Translation: CN-106705967-A (Year: 2017).*
First Office Action in Chinese Application No. 201810579130.3 dated Oct. 29, 2020, 15 pages.
First Office Action in Chinese Application No. 201810554631.6 dated Oct. 26, 2020, 17 pages.
International Search Report in PCT/CN2019/089628 dated Sep. 2, 2019, 7 pages.
Written Opinion in PCT/CN2019/089628 dated Sep. 2, 2019, 6 pages.
The Second Office Action in Chinese Application No. 201810554631.6 dated Apr. 20, 2021, 20 pages.

* cited by examiner

Amended FIG. 2

SYSTEMS AND METHODS FOR INDOOR POSITIONING

CROSS-REFERENCE TO RELATED APPLICATIONS

This application is a continuation of International Patent Application No. PCT/CN2019/089628, filed on May 31, 2019, which claims priority to Chinese Patent Application No. 201810554631.6, filed on Jun. 1, 2018, and Chinese Patent Application No. 201810579130.3, filed on Jun. 7, 2018, the contents of each of which are incorporated herein by reference in their entirety.

TECHNICAL FIELD

This present disclosure generally relates to systems and methods for positioning technology, and in particular, to systems and methods for indoor positioning.

BACKGROUND

With the development of science and technology, an outdoor navigation system has been widely used in people's daily lives. A GPS positioning technology may be accurate for the outdoor navigation system. However, in a complex indoor environment, such as a shopping mall or a food court, GPS signals may be attenuated due to the complexity of indoor environment, and thus it is difficult for people to find the destination accurately. In this case, an indoor positioning system may be used to help people find the destination, such as a shop or a restaurant, based on a detailed route tip. Thus, it is desirable to develop effective systems and methods for indoor positioning.

SUMMARY

According to an aspect of the present disclosure, a method may include one or more of the following operations performed by at least one processor. The method may include obtaining a first location of a subject at a first time point. The method may also include determining one or more motion parameters associated with the subject at least based on one or more sensors carried by the subject. The method may also include determining, based on the first location of the subject and the one or more motion parameters associated with the subject, a second location of the subject at a second time point after the first time point. The method may further include adjusting, at least based on surroundings information associated with the subject at the second time point, the second location of the subject to determine a target location of the subject.

In some embodiments, the one or more motion parameters associated with the subject may include at least one of a step length, a step count, or a heading direction.

In some embodiments, the method may also include determining the second location of the subject by using a pedestrian dead reckoning (PDR) algorithm.

In some embodiments, the method may also include obtaining one or more images from one or more image capturing devices carried by the subject. The method may also include extracting one or more features associated with the one or more images. The method may also include determining, based on the one or more features associated with the one or more images, the surroundings information associated with the subject. The method may further include adjusting, based on the surroundings information associated with the subject, the second location of the subject.

In some embodiments, the method may also include determining, based on the surroundings information associated with the subject and the one or more motion parameters associated with the subject, pose information associated with the one or more image capturing devices. The method may further include adjusting, based on the pose information associated with the one or more capturing devices, the second location of the subject.

In some embodiments, the method may also include optimizing the pose information associated with the one or more capturing devices by performing a loop detection.

In some embodiments, the method may also include determining a similarity between at least one of the one or more images and a pre-obtained image. The method may further include determining that a closed loop is formed in response to a determination that the similarity between the at least one of the one or more images and the pre-obtained image is greater than a preset threshold.

In some embodiments, the method may also include determining, based on the one or more motion parameters associated with the subject, a confidence level relating to the surroundings information associated with the subject. The method may further include determining, based on the second location and the confidence level relating to the surroundings information associated with the subject, the target location of the subject.

In some embodiments, the one or more sensors may include at least one of a GPS device, an inertial measurement unit (IMU) sensor, a geomagnetic sensor, or a pressure sensor.

In some embodiments, the method may also include obtaining a destination of the subject. The method may further include determining a path from the target location of the subject to the destination of the subject.

In some embodiments, the method may also include determining at least one direction of the path from the target location of the subject to the destination of the subject. The method may further include displaying an arrow indicating the direction of the path from the target location of the subject to the destination of the subject.

In some embodiments, the method may also include establishing a multiple-dimensional coordinate system based on one or more pre-obtained images. The method may further include determining coordinates of at least one of the first location, the second location, the target location, or the destination of the subject in the multiple-dimensional coordinate system.

According to an aspect of the present disclosure, a system for indoor positioning may include at least one storage medium storing a set of instructions, and at least one processor in communication with the at least one storage medium. When executing the stored set of instructions, the at least one processor may cause the system to obtain a first location of a subject at a first time point. The at least one processor may also cause the system to determine one or more motion parameters associated with the subject at least based on one or more sensors carried by the subject. The at least one processor may also cause the system to determine, based on the first location of the subject and the one or more motion parameters associated with the subject, a second location of the subject at a second time point after the first time point. The at least one processor may further cause the system to adjust, at least based on surroundings information associated with the subject at the second time point, the second location of the subject to determine a target location of the subject.

According to still another aspect of the present disclosure, a non-transitory computer readable medium may include at least one set of instructions for positioning. Wherein when executed by at least one processor, the at least one set of instructions may cause the at least one processor to perform a method. The method may include obtaining a first location of a subject at a first time point. The method may also include determining one or more motion parameters associated with the subject at least based on one or more sensors carried by the subject. The method may also include determining, based on the first location of the subject and the one or more motion parameters associated with the subject, a second location of the subject at a second time point after the first time point. The method may further include adjusting, at least based on surroundings information associated with the subject at the second time point, the second location of the subject to determine a target location of the subject.

According to still another aspect of the present disclosure, a method may include one or more of the following operations performed by at least one processor. The method may include obtaining location information associated with a destination. The method may also include obtaining a visual image. The method may also include performing an image matching operation on the visual image and a pre-obtained image of a plurality of pre-obtained images in a database. The method may further include determining a target location of a subject in an indoor three-dimensional coordinate system based on a result of the image matching operation and data obtained by one or more sensors. The method may still further include determining a path from the target location of the subject to the destination.

In some embodiments, the method may also include determining a first heading direction and a first walking distance of the subject based on the data obtained by the one or more sensors according to an inertial measurement method. The method may also include determining a second heading direction and a second walking distance of the subject based on the data obtained by the one or more sensors according to a pedestrian dead reckoning (PDR) algorithm. The method may further include determining pose information associated with the visual image by performing a data fusion operation on the result of the image matching operation, the first heading direction, the first walking distance, the second heading direction, and the second walking distance. The method may still further include determining the target location of the subject based on the pose information associated with the visual image.

In some embodiments, the method may also include performing a loop detection on the fused data. The method may also include optimizing the fused data based on a closed loop formed in the loop detection. The method may further include determining the pose information associated with the visual image based on the optimized fused data.

In some embodiments, the method may also include determining a similarity between a current visual image and a pre-obtained image of the plurality of pre-obtained images. The method may further include determining that the closed loop is formed in response to a determination that the similarity between the current visual image and one pre-obtained image of the plurality of pre-obtained images is greater than a preset threshold.

In some embodiments, the method may also include determining coordinates of the target location of the subject in the indoor three-dimensional coordinate system, wherein the three-dimensional coordinate system is established based on a visual global positioning method. The method may further include determining coordinates of the destination in the indoor three-dimensional coordinate system.

In some embodiments, the method may also include determining at least one arrow indicating a direction of a path from the target location to the destination. The method may further include displaying the arrow on an interface of a terminal device.

In some embodiments, the interface may be an augmented reality (AR) based real-time navigation interface. The method may also include combining the at least one arrow and the path from the target location to the destination. The method may further include displaying the combined at least one arrow and the path from the target location to the destination on the AR based real-time navigation interface.

According to still another aspect of the present disclosure, an indoor positioning system may include an image obtaining module, an image matching module, a pose determination module, and a navigation module. The image obtaining module may be configured to obtain location information associated with a destination. The image obtaining module may be configured to obtain a visual image. The image matching module may be configured to perform an image matching operation on the visual image and a pre-obtained image of a plurality of pre-obtained images in a database. The pose determination module may be configured to determine a target location of a subject in an indoor three-dimensional coordinate system based on a result of the image matching operation and data obtained by one or more sensors. The navigation module may be configured to determine a path from the target location of the subject to the destination.

According to still another aspect of the present disclosure, a computer readable storage medium may store instructions. The instructions, when executed by a system, may cause the system to implement a method. The method may include obtaining location information associated with a destination. The method may also include obtaining a visual image. The method may also include performing an image matching operation on the visual image and a pre-obtained image of a plurality of pre-obtained images in a database. The method may further include determining a target location of a subject in an indoor three-dimensional coordinate system based on a result of the image matching operation and data obtained by one or more sensors. The method may still further include determining a path from the target location of the subject to the destination.

According to still another aspect of the present disclosure, an indoor positioning apparatus may include a navigation program. The navigation program, when executed by a system, may cause the system to implement a method. The method may include obtaining location information associated with a destination. The method may also include obtaining a visual image. The method may also include performing an image matching operation on the visual image and a pre-obtained image of a plurality of pre-obtained images in a database. The method may further include determining a target location of a subject in an indoor three-dimensional coordinate system based on a result of the image matching operation and data obtained by one or more sensors. The method may still further include determining a path from the target location of the subject to the destination.

According to still another aspect of the present disclosure, a method may include one or more of the following operations performed by at least one processor. The method may include obtaining first location information of a subject in a first location. The method may also include obtaining one or more motion parameters associated with the subject. The method may also include determining, based on the first location information of the subject and the one or more motion parameters associated with the subject, second location information of the subject in a second location. The method may further include obtaining surroundings information associated with the subject in the second location. The method may still further include correcting, based on the surroundings information associated with the subject in the second location, the second location information of the subject in the second location.

In some embodiments, obtaining the first location information of the subject in the first location may include at least one of vision positioning information or satellite positioning information.

In some embodiments, the surroundings information associated with the subject in the second location may include an image in the viewing angle of the subject in the second location.

In some embodiments, the method may also include determining, based on the one or more motion parameters associated with the subject, a confidence level relating to the surroundings information associated with the subject in the second location.

In some embodiments, the method may also include obtaining a destination of the subject. The method may further include providing a navigation to the subject based on the corrected second location information of the subject in the second location and the destination of the subject.

According to still another aspect of the present disclosure, a positioning system may include a first location module, a parameter obtaining module, a second location module, an surroundings information obtaining module, and a correction module. The first location module may be configured to obtain first location information of a subject in a first location. The parameter obtaining module may be configured to obtain one or more motion parameters associated with the subject. The second location module configured to determine, based on the first location information of the subject and the one or more motion parameters associated with the subject, second location information of the subject in a second location. The surroundings information obtaining module configured to obtain surroundings information associated with the subject in the second location. The correction module configured to correct, based on the surroundings information associated with the subject in the second location, the second location information of the subject in the second location.

In some embodiments, the first location module may include at least one of a vision positioning unit or a satellite positioning unit. The vision positioning unit may be configured to obtain the vision positioning information of the subject in the first location. The satellite positioning unit may be configured to obtain the satellite positioning information of the subject in the first location.

In some embodiments, the surroundings information obtaining module may include an image obtaining unit configured to obtain the surroundings information associated with the subject in the second location that includes an image in the viewing angle of the subject in the second location.

In some embodiments, the correction module may include a judging unit configured to determine, based on the one or more motion parameters associated with the subject, a confidence level relating to the surroundings information associated with the subject in the second location.

In some embodiments, the positioning system may include a navigation module. The navigation module may be configured to obtain a destination of the subject. The navigation module may be configured to provide a navigation to the subject based on the corrected second location information of the subject in the second location and the destination of the subject.

According to still another aspect of the present disclosure, a computer readable storage medium may store instructions. The instructions, when executed by a system, may cause the system to implement a positioning method.

According to still another aspect of the present disclosure, an apparatus for positioning may include at least one processor configured to perform a positioning method.

The technical solutions provided by the embodiments of the present disclosure may have the following beneficial effects:

By applying a combination of different positioning techniques, such as, a vision positioning technique, a visual-inertial odometry (VIO) based technique and a pedestrian dead reckoning (PDR) based technique for positioning, the errors in the result of positioning may be reduced and the accuracy of the positioning may be improved. In some embodiments, the different positioning techniques may be jointly implemented and the results of the different positioning techniques may be further processed to provide the final location information of the subject. For example, the location of the subject determined according to the PDR based technique may be corrected based on the pose information of an image capturing device carried by the subject. The pose information of the image capturing device may be determined using the surroundings information of the subject according to the vision positioning technique. As such, cumulative errors of the result of the PDR based technique may be reduced, and the accuracy of the positioning may be improved. Then, by combining the augmented reality (AR) technology with a navigation process, a safer and more convenient navigation service may be provided to the subject.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
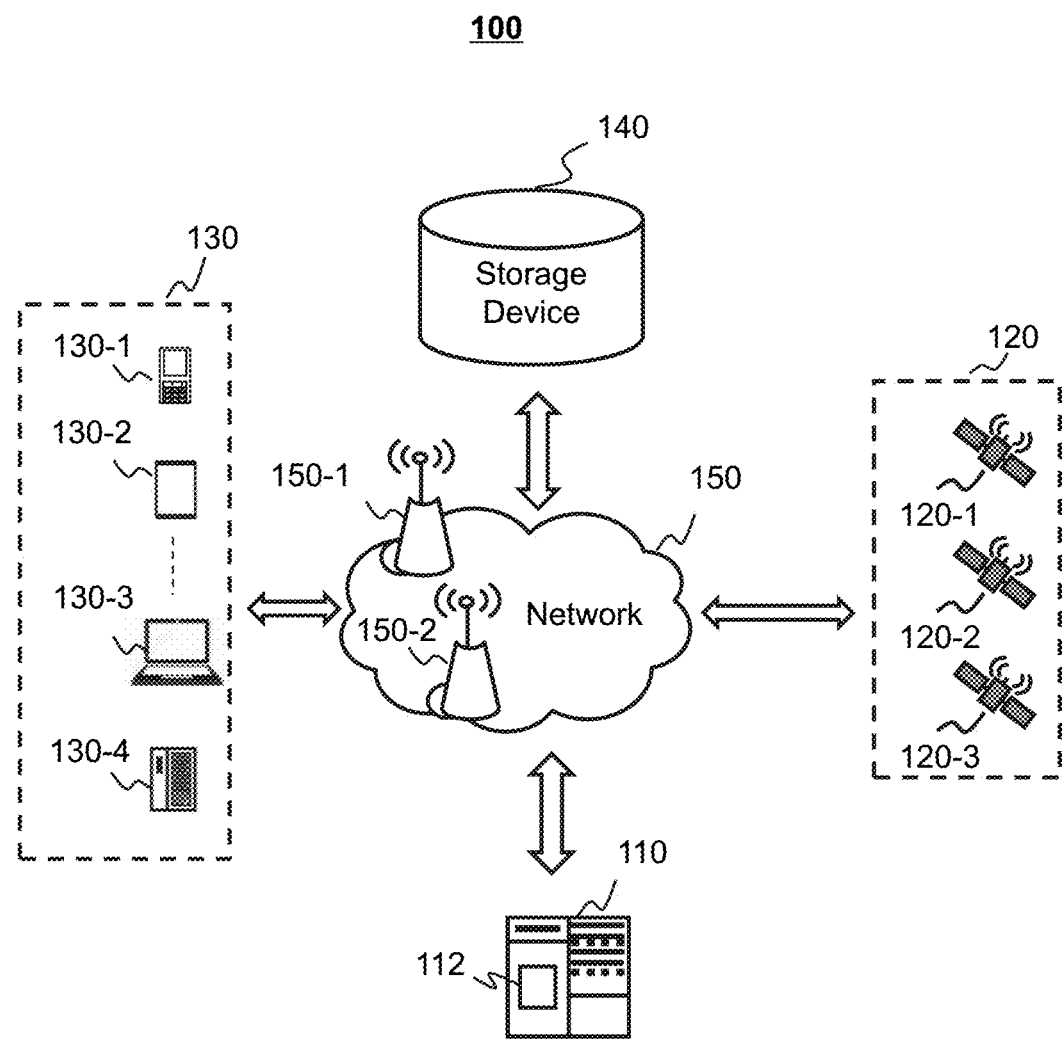
FIG. 1 is a schematic diagram illustrating an exemplary positioning system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for indoor positioning and navigation. The systems and methods may obtain a first location of a subject (e.g., a user) at a first time point. The systems and methods may determine one or more motion parameters (e.g., a step count, a step length, a heading direction) associated with the subject at least based on data obtained from one or more sensors (e.g., a GPS device, an IMU sensor, a geomagnetic sensor, a pressure sensor) carried by the subject. The systems and methods may determine, based on the first location of the subject and the one or more motion parameters associated with the subject, a second location of the subject at a second time point after the first time point. The systems and methods may adjust, at least based on surroundings information associated with the subject at the second time point, the second location of the subject to determine a target location of the subject. Accordingly, a real time location of the subject in an indoor environment, which may be represented by the target location of the subject, may be determined. Then, the systems and methods may determine a path from the real time location of the subject to a destination of the subject.

FIG. 1 is a schematic diagram illustrating an exemplary positioning system 100 according to some embodiments of the present disclosure. In some embodiments, the positioning system 100 may include a server 110, a positioning and navigation system 120, a terminal device 130, a storage device 140, and a network 150.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the terminal device 130, the storage device 140, and/or the positioning and navigation system 120 via the network 150. As another example, the server 110 may be directly connected to the terminal device 130, and/or the storage device 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data to perform one or more functions described in the present disclosure. For example, the processing engine 112 may obtain a first location of a subject at a first time point. As another example, the processing engine 112 may determine one or more motion parameters associated with the subject at least based on one or more sensors carried by the subject. As still another example, the processing engine 112 may determine, based on the first location of the subject and the one or more motion parameters associated with the subject, a second location of the subject at a second time point after the first time point. As still another example, the processing engine 112 may adjust, at least based on surroundings information associated with the subject at the second time point, the second location of the subject to determine a target location of the subject. As used herein, a location of a subject may refer to a representation of the geographical position of the subject in the real world. For example, the first location of the subject at the first time point may denote the representation of a first geographical position of the subject in the real world at the first time point. The second location of the subject at the second time point and the target location of the subject at the second point may each denote a representation of a second geographical position of the subject in the real world at the second time point. In some embodiments, for better understanding, the target location of the subject at the second time point may also be referred to as an adjusted (or corrected) second location of the subject at the second time point. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the server 110 may be connected to the network 150 to communicate with one or more components (e.g., the terminal device 130, the storage device 140, and/or the positioning and navigation system 120) of the positioning system 100. In some embodiments, the server 110 may be directly connected to or communicate with one or more components (e.g., the terminal device 130, the storage device 140, and/or the positioning and navigation system 120) of the positioning system 100.

The positioning and navigation system 120 may determine information associated with an object, for example, one or more of the terminal devices 130. In some embodiments, the positioning and navigation system 120 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The positioning and navigation system 120 may include one or more satellites, for example, a satellite 120-1, a satellite 120-2, and a satellite 120-3. The satellites 120-1 through 120-3 may determine the information mentioned above independently or jointly. The satellite positioning and navigation system 120 may send the information mentioned above to the network 150, the terminal device 130 via wireless connections.

In some embodiments, the terminal devices 130 may include a mobile device 130-1, a tablet computer 130-2, a laptop computer 130-3, a telephone 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc. In some embodiments, the server 110 may be integrated into the terminal device 130.

In some embodiments, the terminal device 130 may be equipped with one or more sensors. The one or more sensors may include a GPS device, a camera, an inertial measurement unit (IMU) sensor, a geomagnetic sensor, a pressure sensor, or the like, or any combination thereof. The camera may be configured to obtain one or more images that include scenes within the viewing angle of the camera. The GPS device may refer to a device that is capable of receiving geolocation and time information from GPS satellites and calculating the device's geographical position. The IMU sensor may refer to an electronic device that measures an object's specific force, angular rate, and sometimes the magnetic field surrounding the object, using various inertial sensors, such as an accelerometer, a gyroscope, or a magnetometer. In some embodiments, a combination of the GPS device and the IMU sensor may provide real-time pose information of the terminal device 130, including the position and orientation of the terminal device 130 at each time point. The geomagnetic sensor may measure the earth's magnetic field to provide the heading direction of the terminal device 130. The pressure sensor may refer to a device for measuring pressure of gases or liquids.

The storage device 140 may store data and/or instructions. In some embodiments, the storage device 140 may store data obtained from the terminal device 130, the positioning and navigation system 120, the processing engine 112, and/or an external storage device. For example, the storage device 140 may store a location of a subject at a time point received from one or more sensors (e.g., a GPS device). As another example, the storage device 140 may store one or more motion parameters associated with the subject determined by the processing engine 112. In some embodiments, the storage device 140 may store data and/or instructions that the server 110 may execute or use to perform exemplary methods described in the present disclosure. For example, the storage device 140 may store instructions that the processing engine 112 may execute or use to determine, based on the first location of the subject and the one or more motion parameters associated with the subject, the second location of the subject at the second time point after the first time point. As another example, the storage device 140 may store instructions that the processing engine 112 may execute or use to adjust, at least based on surroundings information associated with the subject at the second time point, the second location of the subject. As still another example, the storage device 140 may store instructions that the processing engine 112 may execute or use to determine a target location of the subject.

In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 150 to communicate with one or more components (e.g., the server 110, the terminal device 130, and/or the positioning and navigation system 120) of the positioning system 100. One or more components of the positioning system 100 may access the data or instructions stored in the storage device 140 via the network 150. In some embodiments, the storage device 140 may be directly connected to or communicate with one or more components (e.g., the server 110, the terminal device 130, and/or positioning and navigation system 120) of the positioning system 100. In some embodiments, the storage device 140 may be part of the server 110.

The network 150 may facilitate exchange of information and/or data. In some embodiments, one or more components (e.g., the server 110, the terminal device 130, the storage device 140, or the positioning and navigation system 120) of the positioning system 100 may send information and/or data to other component(s) of the positioning system 100 via the network 150. For example, the server 110 may obtain/acquire one or more images from one or more image capturing devices (e.g., a camera) carried by a subject via the network 150. In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points (e.g., 150-1, 150-2), through which one or more components of the positioning system 100 may be connected to the network 150 to exchange data and/or information.

It should be noted that the positioning system 100 is merely provided for the purposes of illustration, and is not intended to limit the scope of the present disclosure. For persons having ordinary skills in the art, multiple variations or modifications may be made under the teachings of the present disclosure. For example, the positioning system 100 may further include a database, an information source, etc. As another example, the positioning system 100 may be implemented on other devices to realize similar or different functions. In some embodiments, the GPS device may also be replaced by other positioning device, such as BeiDou. However, those variations and modifications do not depart from the scope of the present disclosure.

Figure 2:
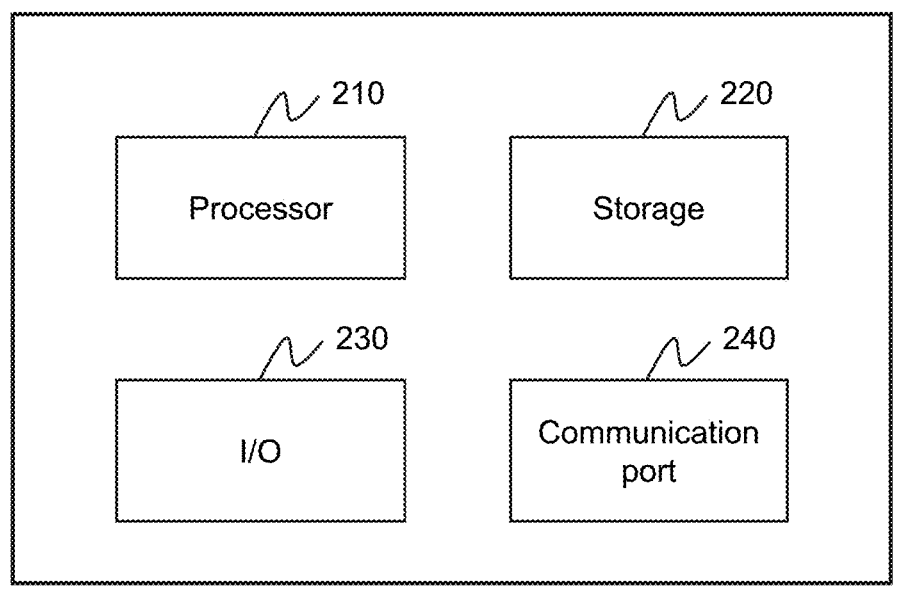
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device 200 on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 112 in accordance with techniques described herein. The computer instructions may include, for example, routines, programs, objects, components, data structures, procedures, modules, and functions, which perform particular functions described herein. For example, the processor 210 may process data obtained from the server 110, the terminal device 130, the storage device 140, and/or any other component of the positioning system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the server 110, the terminal device 130, the storage device 140, and/or any other component of the positioning system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 120 for determining a location of a subject.

The I/O 230 may input and/or output signals, data, information, etc. In some embodiments, the I/O 230 may enable a user interaction with the processing engine 112. In some embodiments, the I/O 230 may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 240 may be connected to a network (e.g., the network 160) to facilitate data communications. The communication port 240 may establish connections between the processing engine 112 and the terminal device 130, or the storage device 140. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
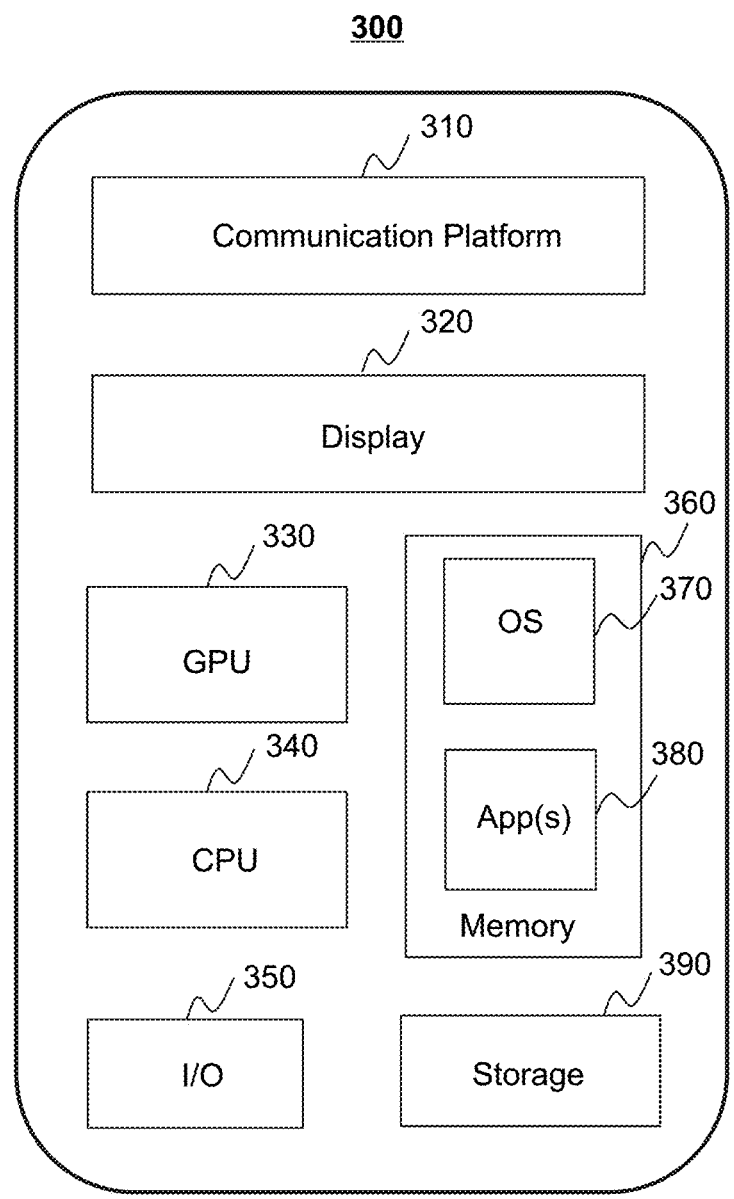
FIG. 3 is a schematic diagram illustrating exemplary hardware and/or software components of an exemplary mobile device on which a terminal device may be implemented according to some embodiments of the present disclosure.

FIG. 3 is a schematic diagram illustrating exemplary hardware and/or software components of an exemplary mobile device on which a terminal device may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to positioning or other information from the processing engine 112. User interactions with the information stream may be achieved via the I/O 350 and provided to the processing engine 112 and/or other components of the positioning system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
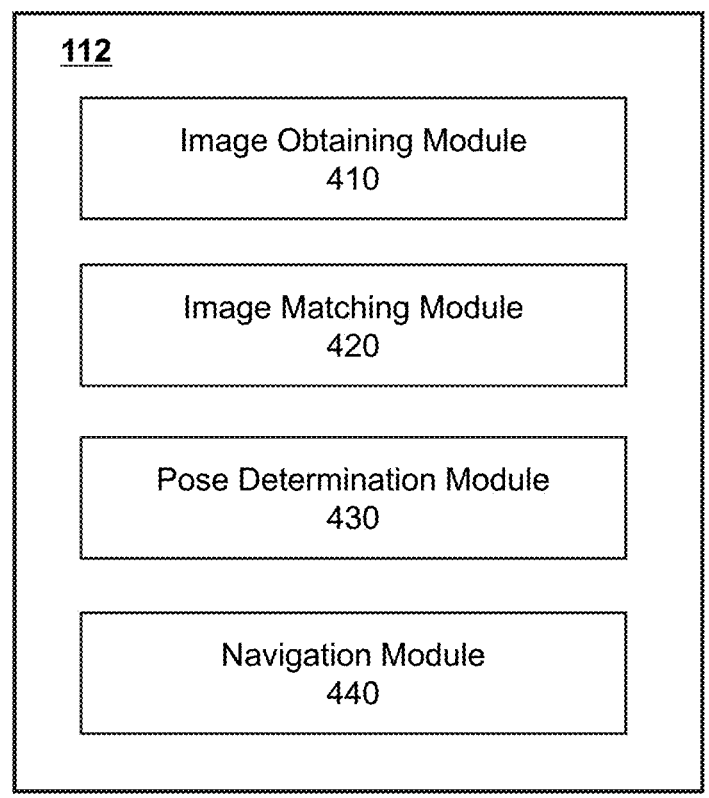
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include an image obtaining module 410, an image matching module 420, a pose determination module 430, and a navigation module 440. The image obtaining module 410, the image matching module 420, the pose determination module 430, and the navigation module 440 may be in communication with each other for data transmission.

The image obtaining module 410 may be configured to obtain an image. In some embodiments, the image obtaining module 410 may obtain an image via a visual sensor (e.g., camera) installed in the terminal device 130 (e.g., a mobile phone). The terminal device 130 may include a smart phone, a smart watch, a tablet computer, a smart camera, an augmented reality device, or the like. When a user holds the mobile phone and uses it for navigation, the image obtaining module 410 may capture the image via a rear camera installed on the mobile phone. The captured image may be used as the image including surroundings information of the user. In some embodiments, in order to obtain real-time images of the surroundings, the image obtaining module 410 may capture images at every other period of time, for example, 0.05 seconds, 0.1 seconds, 0.15 seconds.

The image matching module 420 may be configured to perform an image matching operation. For example, the image matching module 420 may perform the image matching operation on the image obtained by the image obtaining module 410 and a pre-obtained image of a plurality of pre-obtained images in a database. The image matching operation may include a grayscale based technique, a feature based technique, or the like. It shall be noted that the computational load of the grayscale based technique may be generally large and thus the response speed of the terminal device 130 may be decreased, which may influence user experience. Therefore, the feature based technique may be preferentially used for the indoor positioning since the computational load of the indoor positioning may be less than that of the outdoor load. In the feature based technique, one or more features of the obtained image may be extracted. For example, one or more description vectors that represents the obtained image may be extracted. One or more key points of the obtained image may be detected. A local feature descriptor may be constructed based on the one or more key points and the one or more description vectors. Then, the one or more features of the obtained image may be obtained according to the one or more feature descriptor. The one or more features of the obtained image may be further compared with those of the pre-obtained image. The feature based technique may include a scale-invariant feature transform (SIFT) algorithm, a speeded-up robust features (SURF) algorithm, a binary robust invariant scalable keypoints (BRISK) algorithm, a oriented fast and rotated BRIEF (ORB) algorithm, a Harris algorithm, or the like.

The pose determination module 430 may be configured to perform a location tracking on the subject. In some embodiments, the pose determination module 430 may determine the pose information of the terminal device 130 based on a result of the image matching operation, and data obtained by one or more sensors in the terminal device 130. The pose information may reflect a real time position and orientation of the subject that carries the terminal device 130.

For example, when the subject uses an indoor positioning service via the terminal device 130, a camera installed in the terminal device 130 may capture images at every other period of time. For brevity, two successively captured images, including a first image and a second image, may be taken as an example. The image matching module 420 may perform a first image matching operation on the first image and the pre-obtained image of the plurality of pre-obtained images in the database. The pose determination module 430 may determine the pose information associated with the first image based on a result of the first image matching operation. The pose information associated with the first image may also be referred to as the absolute pose that corresponds to an initial location of the subject. Similarly, the image matching module 420 may perform a second image matching operation on the second image and the first image. The pose determination module 430 may determine the pose information associated with the second image based on a result of the second image matching operation, data measured by an acceleration sensor, and data measured by a direction sensor. The pose information associated with the second image may also be referred to as the relative pose that corresponds to a relative location with respect to the initial location of the subject. For each pair of adjacent images, a relative pose associated with the latter image may be determined based on the process described above. Accordingly, when the initial location of the subject corresponding to an image captured at a prior time point is determined, the real time location of the subject may be updated continuously.

The navigation module 440 may implement a navigation function. The navigation module 440 may determine a navigation path from a real time location of the subject to the destination. In some embodiments, the navigation module 440 may determine the location of the destination in an indoor three-dimensional (3D) coordinate system established by a vision positioning technique. The vision positioning technique may position the subject based on a given reconstructed indoor space model according to an image matching technique. However, due to a texture blur and/or an inaccurate judgment of a similarity between images, the accuracy of the positioning may be low. The navigation path may also be determined based on the indoor 3D coordinate system. In some embodiments, the indoor 3D coordinate system (e.g., an environment map) may be determined by performing an image matching operation on a plurality of pre-obtained images. For example, two images may be captured at different time points in an indoor environment. One or more features of a first image captured at a first time point may be extracted. The image matching operation (e.g., by the feature based technique) may be performed on the first image and a pre-obtained image. For a second image obtained after the first time point, the image matching operation may be performed on the second image and a pervious image (e.g., the first image). The pose information (e.g., a relative pose) of the second image may be determined by performing a matrix transformation corresponding to the image matching result according to an Epipolar geometry algorithm. Then, the actual pose of the second image may be generated based on the relative pose of the second image and the pose information of the first image. Assuming that the pose information of the first image is an absolute pose, an actual pose of the image obtained after the first time point may be determined based on the absolute pose accordingly. The indoor 3D coordinate system may be determined by performing a 3D reconstruction on the matched features and a pose transformation relationship of the pose information of the images. In some embodiments, the indoor 3D coordinate system (e.g., the environment map) may be determined according to a 3D reconstruction algorithm (e.g., a structure from motion (SFM) algorithm). For example, a coordinate system corresponding to the pose information (e.g., the absolute pose) of the first image may be determined as a reference coordinate system (i.e., the indoor 3D coordinate system). The image obtained after the first time point may be registered in the reference coordinate system based on the pose information (e.g., the relative pose) of the image. As used herein, image registration may refer to a process of transforming different sets of data into a common coordinate system (e.g., the reference coordinate system). Accordingly, the environment map may be generated. In some embodiments, the indoor 3D coordinate system may be transformed into a PDR coordinate system (e.g., a PDR coordinate system as described in FIG. 6) according to Equation (1):

$$T_A = T_{mc} * T_{ci} * T_{pi}^{-1} * T_B \qquad \text{Equation (1)},$$

where $T_A$ refers to the reference coordinate system; $T_B$ refers to the PDR coordinate system; $T_{mc}$ refers to pose information of the visual sensor (e.g., a camera) in the reference coordinate system; $T_{ci}$ refers to a pose relationship between the visual sensor and an IMU sensor; and $T_{pi}$ refers to pose information of the IMU sensor in the PDR coordinate system.

It should be understood that the description of the processing engine 112 is merely exemplary and is not intended to limit the scope of the present disclosure. In some embodiments, the processing engine 112 may include other modules. For example, the processing engine 112 may include a storage module configured to store data obtained from the image obtaining module 410, the image matching module 420, the pose determination module 430, and/or the navigation module 440.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

Figure 5:
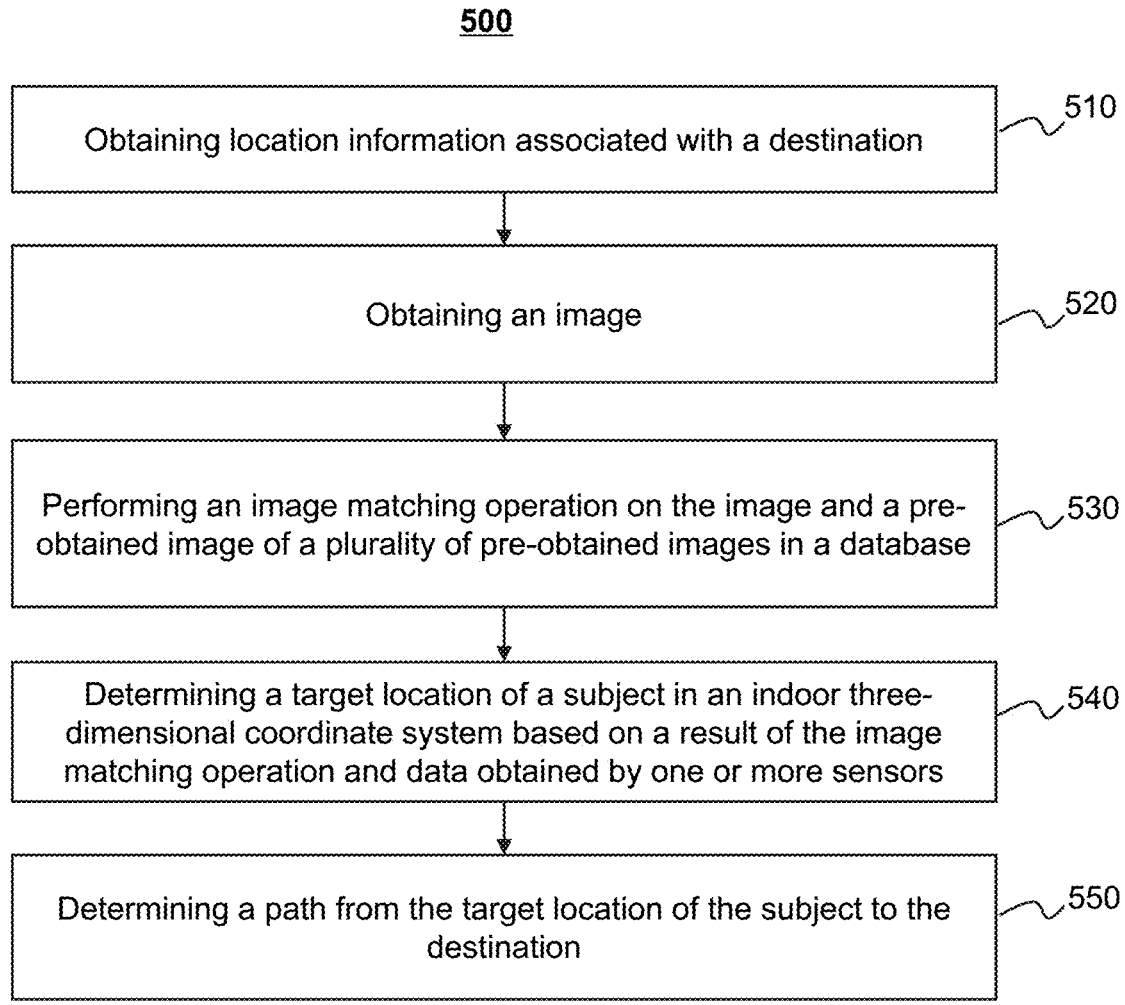
FIG. 5 is a flowchart illustrating an exemplary process for indoor positioning according to some embodiments of the present disclosure.

FIG. 5 is a flowchart illustrating an exemplary process for indoor positioning according to some embodiments of the present disclosure. The process 500 may be executed by the positioning system 100. For example, the process 500 may be implemented as a set of instructions stored in the storage 220. The processor 210 and/or the modules in FIG. 4 may execute the set of instructions, and when executing the instructions, the processor 210 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 as illustrated in FIG. 5 and described below is not intended to be limiting.

In 510, the processing engine 112 may obtain a location of a destination. In some embodiments, an indoor 3D coordinate system and/or an environment map may be established. A plurality of pre-obtained images may be obtained. A plurality of significant feature points in the plurality of pre-obtained images may be extracted by a feature based technique. Coordinates of the plurality of feature points in the indoor 3D coordinate system may be determined based on a matrix transformation. Then, at least formed by the plurality of feature points, an electronic map of the indoor environment may be established, which is convenient for positioning and navigation.

In some embodiments, the plurality of pre-obtained images may be stored in a database according to a process described below. A plurality of pre-obtained images may be obtained at every other walking distance or time period to cover an entire indoor area. A feature extraction operation may be performed on the plurality of pre-obtained images to extract feature points of the pre-obtained images. The plurality of pre-obtained images, the plurality of extracted feature points, the locations where each pre-obtained image is obtained, the time points when each pre-obtained image is obtained, and the geographical indications (e.g., a shop name, a restaurant name, an elevator) corresponding to each pre-obtained image may be stored in the database together. When one of the pre-obtained images is accessed, its corresponding feature points, its corresponding time point, and its corresponding geographical indication may be simultaneously identified.

In 520, the processing engine 112 (e.g., the image obtaining module 410) may obtain an image. In some embodiments, the image may be obtained via a visual sensor of a terminal device (e.g., the terminal device 130). The terminal device may include a smart phone, a smart watch, a smart camera, a tablet computer, an augmented reality device, or the like, or any combination thereof. In some embodiments, the visual sensor may shake as the subject moves, which may cause blurring of the obtained image. In some embodiments, when or after obtaining the image, an anti-shake technique may be used to reduce the influence of subject motion on the image quality. For example, when obtaining the image, the shake of the sensor may be detected by a gyro sensor. Then, a compensation may be performed on the image, based on the detected result of the gyro sensor, including a shaking direction and a displacement of lens in a lens group, to reduce the influence of the shake on the image. As another example, after obtaining the image, a swing direction and a swing amplitude of the vision sensor may be determined based on a motion vector. The image may be corrected based on the swing direction and the swing amplitude to reduce the influence of the shake on the image quality.

In 530, the processing engine 112 (e.g., the image matching module 420) may perform an image matching operation on the image and a pre-obtained image of a plurality of pre-obtained images in the database. In some embodiments, the image matching operation may be performed based on a feature based technique. In some embodiments, to perform the image matching operation, a plurality of features of the image with the properties of significance, baseline stability, and descriptiveness may be extracted. Then, the features of the image may be compared with the features of the pre-obtained image. In some embodiments, if the indoor environment is complex and the number of the extracted features is large, the image matching technique may not be effectively conducted. Therefore, in order to improve the processing speed of the positioning system 100, a region of interest may be first determined in the image. Then, the features may be further extracted from the region of interest. For example, the region of interest may be one or more fixed regions of the image, such as a fixed region (e.g., an upper left region, a lower left region, an upper right region, a lower right region) with a certain size.

In 540, the processing engine 112 (e.g., the pose determination module 430) may determine a target location of the subject in an indoor 3-D coordinate system based on a result of the image matching operation and data obtained by one or more sensors. It shall be noted that the image may be easily affected by one or more factors, such as light, which may cause a texture blur and further lead to an inaccuracy judgment of similarity between two images. By effectively combining the visual sensor and one or more other sensors, such as an acceleration sensor and a direction sensor, the performance of different sensors may be complemented to achieve a more accurate and reliable positioning result. The positioning system 100 may combine the image matching result, the VIO based technique, and the PDR based technique to determine the pose information of the image, and further determine the target location of the subject. More descriptions may be found elsewhere in the present disclosure (e.g., FIG. 6 and descriptions thereof). The VIO based technique may be a solution that uses a combination of a camera and an IMU to achieve a simultaneous localization and mapping (SLAM). The PDR based technique may be a relative position based inertial navigation technique. For a given initial location of a subject, a next location of the subject may be determined based on a displacement of the walking of the subject.

In 550, the processing engine 112 (e.g., the navigation module 440) may determine a path from the target location of the subject to the destination. In some embodiments, the path may be determined by performing a route planning based on coordinates of the target location of the subject and coordinates of the destination. The route planning may be determined by a network topology calculation. In some embodiments, an arrow indicating the direction of the path may be displayed in a navigation interface on the terminal device 130. In real life, when the subject moves along the path on the navigation interface, an obstacle, a pedestrian, a vehicle, or the like, on the path may not be noticed by the subject, which may cause inconvenience or even a security risk situation. Therefore, in some embodiments of the present disclosure, the AR technology may be utilized and the path along with the arrow may be displayed in an AR based real-time navigation interface, so that the subject may be able to notice the road condition while viewing the path. In this case, the indoor positioning service may be provided in a safer and more convenient way. Specifically, when the subject uses the terminal device 130 for indoor positioning, the display 320 may display an image (e.g., a real time image) acquired by the visual sensor. The real-time image may display a real-time road condition to the subject. A direction (e.g., left, right, straight forward, backward) that the subject may move along may be provided to the subject based on the target location of the subject determined in operation 540, and the path from the target location of the subject to the destination. The head of an arrow pointing to the direction may be displayed in the real time image. For example, the arrow may be displayed on a lower central position (which is generally corresponding to the ground) of the real time image to guide the subject.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
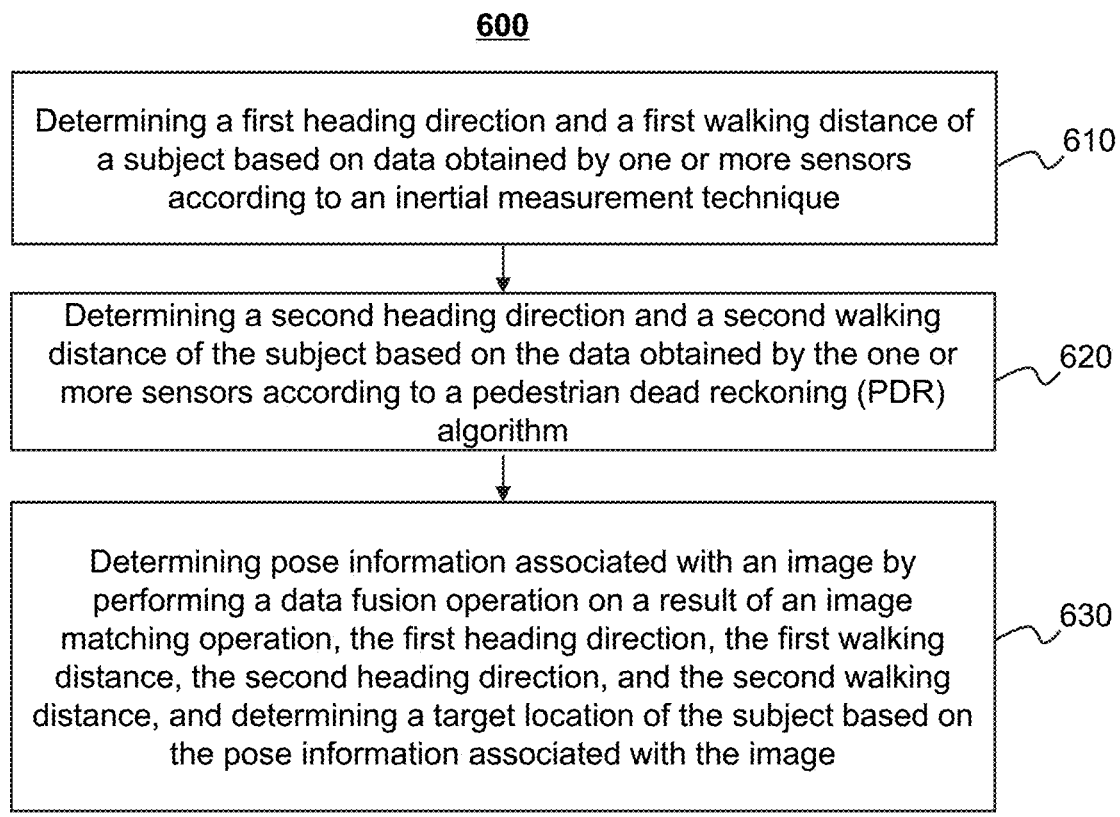
FIG. 6 is a flowchart illustrating an exemplary process for determining a target location of a subject according to some embodiments of the present disclosure.

FIG. 6 is a flowchart illustrating an exemplary process for determining a target location of a subject according to some embodiments of the present disclosure. The process 600 may be executed by the positioning system 100. For example, the process 600 may be implemented as a set of instructions stored in the storage 220. The processor 210 and/or the modules in FIG. 4 may execute the set of instructions, and when executing the instructions, the processor 210 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 as illustrated in FIG. 6 and described below is not intended to be limiting.

The present disclosure may combine an image matching result, a VIO based technique, and a PDR based technique to determine pose information of each of a plurality of images, thereby determining a target location of a subject.

In 610, the processing engine 112 (e.g., the pose determination module 430) may determine a first heading direction and a first walking distance of the subject based on data obtained by one or more sensors according to an inertial measurement technique. For example, the one or more sensors may include an IMU sensor. The IMU sensor may be used to measure three-axis attitude angles (or an angular rate) and an acceleration of the terminal device carried by the subject, and further detect an angular velocity and an acceleration of a visual sensor installed in the terminal device. The pose information of two adjacent images may be determined by performing an integral processing on the detected angular velocity and the acceleration.

In 620, the processing engine 112 (e.g., the pose determination module 430) may determine a second heading direction and a second walking distance of the subject based on the data obtained by the one or more sensors according to a PDR based algorithm. In some embodiments, the second heading direction and the second walking distance of the subject may be determined based on a step count, a step length, the angular velocity and the acceleration detected by the one or more sensors. When the subject walks normally, the acceleration may change regularly with time.

The one or more sensors may include an acceleration sensor. The acceleration sensor may collect a waveform representing the change of the acceleration when the subject moves. The step count of the subject may be determined according to a zero-crossing detection technique. The step length may be determined based on variables such as a maximum value of the acceleration, a minimum value of the acceleration, a height and a weight of the subject by using different technique. A relative location of the subject may be determined based on the step count, the step length, and the second heading direction. For example, assuming that the location of the subject in a PDR coordinate system (e.g., a world coordinate system) at a time point t may be represented as $(x_t, y_t, z_t)$, and the location of the subject at a next time point t+1 may be represented as $(x_{t+1}, y_{t+1}, z_{t+1})$. Regardless of the behavior of going up or down a building, $z_{t+1}$ may be equal to $z_t$, $x_{t+1}$ and $y_{t+1}$ may be determined according to Equation (2) and Equation (3) respectively:

$$x_{t+1} = x_t + L_t \times \sin \theta_t \qquad \text{Equation (2),}$$

$$y_{t+1} = y_t + L_t \times \sin \theta_t \qquad \text{Equation (3)}$$

wherein $L_t$ refers to the step length of the subject, and $\theta_t$ refers to the second heading direction of the subject detected by a direction sensor at the time point t.

In 630, the processing engine 112 (e.g., the pose determination module 430) may determine pose information associated with an image by performing a data fusion operation on a result of an image matching operation, the first heading direction, the first walking distance, the second heading direction, and the second walking distance. The target location of the subject may be determined based on the pose information associated with the image. As used herein, data fusion may refer to a process of integrating multiple data sources to produce more consistent, accurate, and useful information than that provided by any individual data source.

In some embodiments, first pose information (e.g., a first target location) may be determined based on the first heading direction and the first walking distance of the subject. Second pose information (e.g., a second target location) may be determined based on the second heading direction and the second walking distance of the subject. Third pose information (e.g., a third target location) may be determined based on the result of the image matching operation. The pose information associated with the image (e.g., the target location) may be determined by performing the data fusion operation on the first pose information (e.g., the first target location), the second pose information (e.g., the second target location), and the third pose information (e.g., the third target location). For example, geographic coordinates of the target location may be an average value of coordinates of the first target location, coordinates of the second target location, and coordinates of the third target location. The data fusion technique may include a Kalman filtering technique, a particle filtering technique, a neural network-based technique, or the like. The Kalman filter technique may include an extended Kalman filter technique, a related information filtering technique, an extended information filtering technique. In some embodiments, in the Kalman filtering technique, assuming that all variables are Gaussian random variables and a state vector may be used to represent the location of the subject and a feature in the surrounding environment, the Kalman filtering technique may be used to estimate a minimum mean square error based on the first pose information, the second pose information, and the third pose information. The pose information corresponding to the minimum mean square error may be determined as the pose information associated with the image. The recursive feature of the Kalman filtering technique may allow the positioning system 100 to process without an extensive data storage and computations.

In some embodiments, the processing engine 112 may determine the target location of the subject based on a first confidence level of the first pose information (e.g., the first target location), a second confidence level of the third pose information (e.g., the third target location). As used herein, "a confidence level of a location" (e.g., the first confidence level of the first target location, the second confidence level of the third target location) may relate to the reliability of data (e.g., data obtained from the visual sensor, data obtained from the IMU sensor) that determines the location. In some embodiments, the processing engine 112 may determine the first confidence level of the first pose information (e.g., the first target location) based on the quality of data obtained from the IMU sensor, and/or the environmental texture complication. The processing engine 112 may determine the second confidence level of the third pose information (e.g., the third target location) based on the quality of data obtained from the visual sensor (e.g., the camera), for example, an image ambiguity, the number of extracted features in an image, the number of matched features in the image. In some embodiments, the processing engine 112 may determine whether a distance between the third target location corresponding to a first image obtained at a first time point and a location corresponding to a second image obtained before the first time point is less than a distance threshold (e.g., 4 meters). The processing engine 112 may determine whether the second confidence level of the third target location is greater than a first level threshold. In response to a determination that the distance is less than the distance threshold, and the second confidence level is greater than the first level threshold, the processing engine 112 may determine the third target location as the target location of the subject. In response to a determination that the distance is not less than the distance threshold or the second confidence level is not greater than the first level threshold, the processing engine 112 may determine whether the first confidence level of the first target location is greater than a second level threshold. In response to a determination that the first confidence level is greater than the second level threshold, the processing engine 112 may determine the first target location as the target location of the subject. In response to a determination that the first confidence level is not greater than the second level threshold, the processing engine 112 may determine the second target location as the target location of the subject.

For the PDR based technique, there may be an error in the determination of the step length based on the acceleration. As a walking distance of the subject increases, a cumulative error of the PDR based technique may become greater. For the VIO based technique, since the detection of the angular velocity may be affected by geomagnetism, and there may be measurement noise that leads to the cumulative error. Therefore, a loop detection may be performed by combining the result of the image matching operation, the VIO based calculation result, and the PDR based calculation result. A main function of the loop detection may be to eliminate the cumulative errors of the one or more sensors and avoid introducing a redundant variable and a repetitive structure. In some embodiments, the loop detection may include performing an image matching operation. A similarity between a current image and a pre-obtained image of a plurality of pre-obtained images may be calculated to determine whether the current image is similar to the pre-obtained image corresponding to a known position in a database. In response to a determination that the similarity between the current image and the pre-obtained image of the plurality of pre-obtained images is greater than a preset threshold, a closed loop may be formed. The similarity may be determined based on one or more feature points in the images. When a matching rate of the feature points in two images is higher than a threshold, the two images may be regarded as corresponding to a same location in the indoor environment map. The pose information of the current image and/or one or more images obtained before the current image may be corrected based on the detected closed loop. The cumulative errors of the VIO based technique and the PDR based technique may be reduced, and the accuracy of the positioning may be improved.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
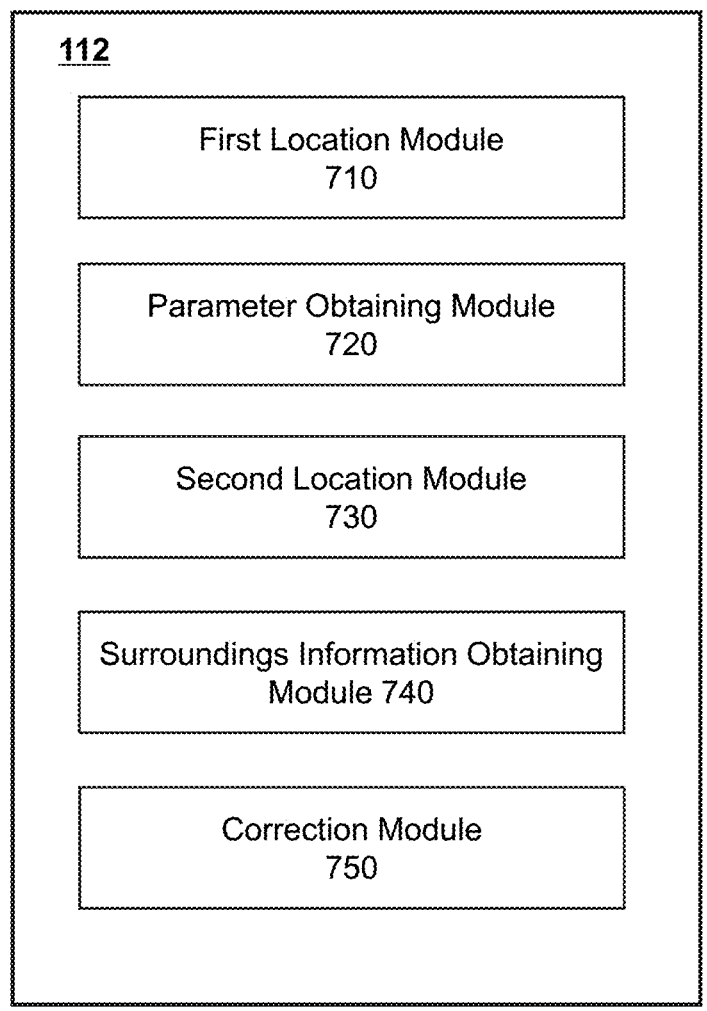
FIG. 7 is a block diagram illustrating an exemplary processing engine according to some embodiments of the present disclosure.

FIG. 7 is a block diagram illustrating an exemplary processing engine according to some embodiments of the present disclosure. The processing engine 112 may include a first location module 710, a parameter obtaining module 720, a second location module 730, a surroundings information obtaining module 740, and a correction module 750.

The first location module 710 may obtain location information of a subject at a first location (also referred to as first location information). In some embodiments, the first location module 720 may include a vision positioning unit and/or a satellite positioning unit. The vision positioning unit may obtain vision positioning information (e.g., an image) of the subject at the first location. The vision positioning unit may obtain a reconstructed indoor space model stored in a storage device (e.g., the storage device 140). The vision positioning unit may obtain the first location information of the subject based on the vision positioning information of the subject at the first location and the reconstructed indoor space model according to an image matching algorithm. The image matching algorithm may include a scale-invariant feature conversion algorithm (SIFT), a speeded up robust feature (SURF), a Harris corner detection algorithm, a smallest univalue segment assimilating nucleus (SUSAN), or the like. The satellite unit may obtain the first location information of the subject from the positioning and navigation system 120 directly.

The parameter obtaining module 720 may obtain one or more motion parameters associated with the subject. In some embodiments, the one or more motion parameters may include a step length, a step count, a heading direction, or the like. The one or more motion parameters may be determined based on a PDR based technique. More descriptions about the one or more motion parameters may be found elsewhere in the present disclosure (e.g., FIG. 9 and the description thereof).

In some embodiments, the terminal device 130 may further include a barometer and/or a thermometer. An atmospheric pressure query table may be determined based on a relationship between an atmospheric pressure value and an altitude. When the subject takes an elevator or walks up/down the stairs, the atmospheric pressure value may gradually decrease as the altitude increases. The floor (e.g., a basement 1, a 5th floor, a 12th floor) on which the subject is located may be determined based on the atmospheric pressure value obtained from the barometer and the atmospheric pressure query table. In some embodiments, the atmospheric pressure value obtained from the barometer may relate to the temperature. The temperature may be determined by using the thermometer. The height of the floor on which the subject is located may be determined based on the temperature and the atmospheric pressure value.

The second location module 730 may determine, based on the first location information of the subject and the one or more motion parameters associated with the subject, location information of the subject at a second location (also referred to as second location information).

The surroundings information obtaining module 740 may obtain surroundings information associated with the subject at the second location. In some embodiments, the surroundings information obtaining module 740 may include an image obtaining unit. The image obtaining unit may obtain first surroundings information such as an image in the viewing angle of an imaging capturing device (e.g., the terminal device 130) carried by the subject at the second location. In some embodiments, the surroundings information obtaining module 740 may further include a WiFi signal obtaining unit, a voice obtaining unit, a ranging unit, or the like. The surroundings information obtaining module 740 may obtain second surroundings information such as, a WiFi signal strength of a certain store, a sound volume of the advertisement of the certain store, a distance from the second location of the subject to a location of the certain store, or the like. In some embodiments, an estimated location of the subject at the second location may be determined based on the second surroundings information associated with the subject at the second location. The estimated location of the subject at the second location may represent the relative location of the subject at the second location with respect to a reference object (e.g., the certain store). For example, the estimated location of the subject at the second location may be determined based on an attenuation degree of the WiFi signal. As another example, the estimated location of the subject at the second location may be determined based on the sound volume of the advertisement of the store according to a sound positioning technique. As still another example, an estimated distance of the subject at the second location may be determined by using the ranging unit (e.g., an infrared apparatus, an ultrasonic apparatus, a laser apparatus) installed in the terminal device 130. The second location of the subject may be determined based on the estimated distance of the subject and the location of the store in the indoor environment map. In some embodiments, the surroundings information obtaining module 740 may further send the surroundings information and the estimated location of the subject to the correction module 750 for further processing.

The correction module 750 may correct, based on the surroundings information associated with the subject at the second location, the second location of the subject. More descriptions regarding the correction of the second location of the subject may be found elsewhere in the present disclosure (e.g., FIG. 10 and the description thereof).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing engine 112 may further include a navigation module. After the subject inputs a destination, the navigation module may provide a navigation to the subject based on the corrected second location of the subject and the destination of the subject. In some embodiments, a navigation path determined by the navigation module may be displayed based on an AR technology. In some embodiments, an arrow indicating the direction of the path may be displayed in a navigation interface on the terminal device 130. In real life, when the subject moves along the path on the navigation interface, an obstacle, a pedestrian, a vehicle, or the like, on the path may not be noticed by the subject, which may cause inconvenience or even a security risk situation. Therefore, in some embodiments of the present disclosure, the AR technology may be utilized and the path along with the arrow may be displayed in an AR based real-time navigation interface, so that the subject may be able to notice the road condition while viewing the path. In this case, the indoor positioning service may be provided in a safer and more convenient way. Specifically, when the subject uses the terminal device 130 for indoor positioning, the display 320 may display an image acquired by the visual sensor. The real-time image may display a real-time road condition to the subject. A direction (e.g., left, right, straight forward, backward) that the subject may move along may be provided to the subject based on the target location of the subject determined in operation 540, and the path from the target location of the subject to the destination. The head of an arrow pointing to the direction may be displayed in the image. For example, the arrow may be displayed on a lower central position (which is generally corresponding to the ground) of the image to guide the subject.

Figure 8:
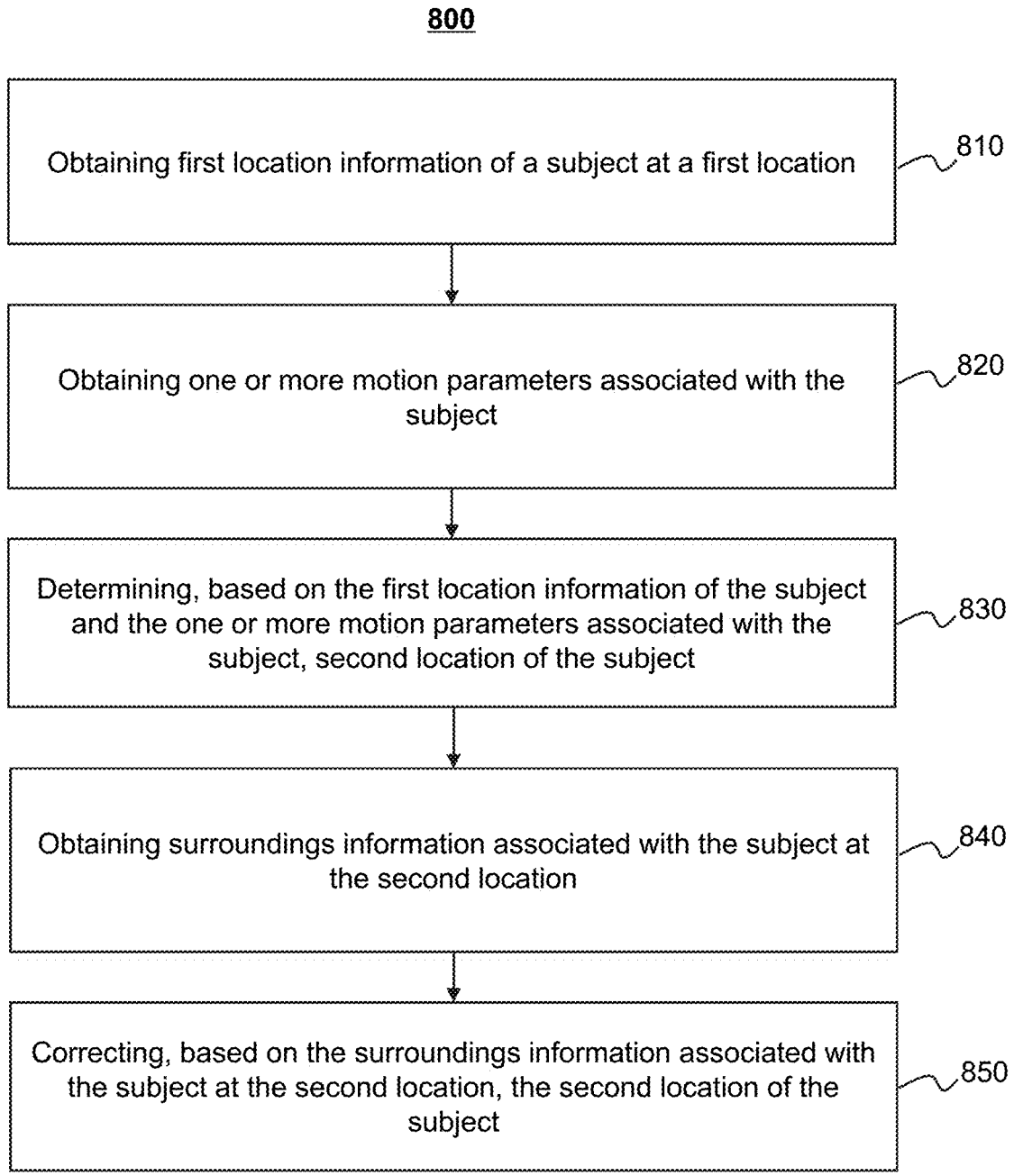
FIG. 8 is a flowchart illustrating an exemplary process for indoor positioning according to some embodiments of the present disclosure.

FIG. 8 is a flowchart illustrating an exemplary process for indoor positioning according to some embodiments of the present disclosure. The process 800 may be executed by the positioning system 100. For example, the process 800 may be implemented as a set of instructions stored in the storage 220. The processor 210 and/or the modules in FIG. 7 may execute the set of instructions, and when executing the instructions, the processor 210 and/or the modules may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process 800 as illustrated in FIG. 8 and described below is not intended to be limiting.

In 810, the first location module 710 may obtain first location information of a subject at a first location. The first location information may include vision positioning information and/or satellite positioning information as described in connection with the first location module 710.

In 820, the parameter obtaining module 720 may obtain one or more motion parameters associated with the subject. In some embodiments, the one or more motion parameters may include a step length, a step count, a heading direction, or the like. The one or more motion parameters may be determined based on a PDR based technique. More description of the obtaining of the one or more motion parameters associated with the subject may be found elsewhere in the present disclosure (e.g., FIGS. 7, 9, and the descriptions thereof).

In 830, the second location module 730 may determine, based on the first location information of the subject and the one or more motion parameters associated with the subject, second location of the subject at a second location. For example, the second location module 730 may determine the second location based on the first location information of the subject and the one or more motion parameters (e.g., the step length, the step count, the heading direction) associated with the subject according to Equation (2) and Equation (3) as described elsewhere in the present disclosure.

In 840, the surroundings information obtaining module 740 may obtain surroundings information associated with the subject at the second location. In some embodiments, the surroundings information associated with the subject at the second location may include an image in the viewing angle of the subject at the second location. For example, the surroundings information obtaining module 740 may obtain the image in the viewing angle of an imaging capturing device (e.g., the terminal device 130) carried by the subject at the second location.

In 850, the correction module 750 may correct, based on the surroundings information associated with the subject at the second location, the second location of the subject. In some embodiments, the correction module 750 may determine, based on the one or more motion parameters associated with the subject, a confidence level relating to the surroundings information associated with the subject at the second location. The confidence level relating to the surroundings information associated with the subject at the second location may be further used to correct the second location of the subject. More descriptions of the correction of the second location of the subject may be found elsewhere in the present disclosure (e.g., FIGS. 7, 10, and the descriptions thereof).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, a navigation process may be added after operation 850. The subject may input a destination via the terminal device 130. The processing engine 112 may provide a navigation path to the subject based on the corrected second location of the subject at the second location and the destination of the subject by performing a path planning.

Figure 9:
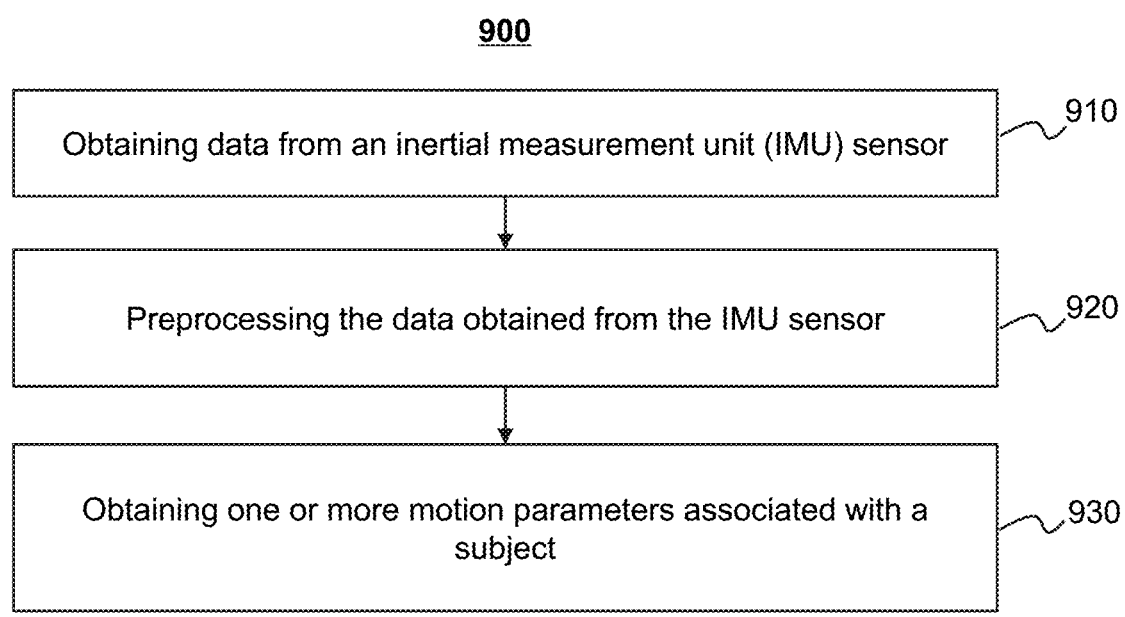
FIG. 9 is a flowchart illustrating an exemplary process for obtaining one or more motion parameters associated with a subject according to some embodiments of the present disclosure.

FIG. 9 is a flowchart illustrating an exemplary process for obtaining one or more motion parameters associated with a subject according to some embodiments of the present disclosure. The process 900 may be executed by the positioning system 100. For example, the process 900 may be implemented as a set of instructions stored in the storage 220. The processor 210 and/or the modules in FIG. 7 may execute the set of instructions, and when executing the instructions, the processor 210 and/or the modules may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process 900 as illustrated in FIG. 9 and described below is not intended to be limiting. In some embodiments, the process 900 may be performed by the parameter obtaining module 720.

In 910, the processing engine 112 (e.g., the parameter obtaining module 720) may obtain data from an IMU sensor. When the subject (e.g., a user) moves, the terminal device 130 carried by the subject may obtain IMU data from the IMU sensor installed in the terminal device 130. The IMU sensor may include an accelerometer, a gyroscope, a magnetometer, or the like. The IMU data may include acceleration data, angular velocity data, magnetic field strength data, or the like.

In 920, the processing engine 112 (e.g., the parameter obtaining module 720) may preprocess the data obtained from the IMU sensor. During the operation of the terminal device 130, the orientation (e.g., a yaw angle, a roll angle, a pitch angle) of the terminal device 130 may change due to such as shaking, flipping, or the like, introducing noise into the data obtained from the IMU sensor. In some embodiments, noise included in the IMU data may be eliminated by performing a filtering operation (i.e., the preprocessing operation). In some embodiments, coordinates of the terminal device 130 may be transformed into coordinates in a stable geodetic coordinate system by performing a coordinate system transformation operation. The IMU data in the geodetic coordinate system may not be affected by the change of the angle of the terminal device 130. After determining the orientation of the terminal device 130 (e.g., the yaw angle, the roll angle, the pitch angle), the IMU data of the terminal device 130 in the geodetic coordinate system may be generated by applying a rotation matrix to the IMU data in the coordinates of the terminal device 130.

In 930, the processing engine 112 (e.g., the parameter obtaining module 720) may obtain one or more motion parameters associated with a subject. The one or more motion parameters associated with the subject may be obtained based on the preprocessed IMU data. The one or more motion parameters may include the step length, the step count, the heading direction, or the like. In some embodiments, the subject (e.g., the user) may generate a large instantaneous acceleration in a vertical direction. The instantaneous acceleration may form an acceleration peak. The step count may be determined based on a peak detection technique. For example, the parameter obtaining module 720 may determine whether the value of an acceleration peak on an acceleration detection axis is greater than a preset acceleration threshold. In response to a determination that the value of the acceleration peak on the acceleration detection axis is greater than the preset acceleration threshold, the parameter obtaining module 720 may determine that a step is detected. In some embodiments, waveforms of acceleration signals of different motion modes (e.g., walking, running, taking an elevator, walking up/down stairs, driving, walking/standing on an escalator) may be different. In some embodiments, the preset acceleration threshold may be related to the motion mode, and the step count of the subject under different motion modes may be determined. In some embodiments, the step length of the subject may be related to one or more factors, such as the step count, a body length, a leg length, a weight of the subject, and the gender of the subject. The step length of an adult may be in a range of 0.8 m~1.2 m. In some embodiments, the step length of the subject may be determined based on an empirical algorithm, for example, an inverted pendulum model, a double pendulum model, a Weinberg empirical algorithm, an optimal parameter algorithm. For example, the step length may be determined using an accelerometer signal based on the Weinberg empirical algorithm according to Equation (4).

$$\text{Step length} = K \times \sqrt[4]{a_{max} - a_{min}} \qquad \text{Equation (4)},$$

wherein, $a_{max}$ refers to a maximum value of an acceleration in a vertical direction at each step, $a_{min}$ refers to a minimum value of the acceleration in the vertical direction at each step, and K refers to a calibration constant.

In some embodiments, assuming that GPS signals obtained by the terminal device 130 is valid, an average step length of the subject may be determined based on a distance of the movement of the subject measured by the GPS device and the step count of the subject. Then, the step length of the subject may be corrected by the average step length of the subject. In some embodiments, the average step length of the subject may be determined based on the motion mode of the subject (e.g., walking, running, taking an elevator, walking up/down stairs, driving, walking/standing on an escalator). For example, assuming that the motion model is walking, the step length of the subject may be corrected by using the average step length of the subject in the motion model of walking. In some embodiments, the heading direction may be determined by using an accelerometer, a gyroscope, and/or a magnetometer. For example, the heading direction may be determined by integrating the angular velocity obtained from the IMU data directly. As another example, an included angle between the terminal device 130 and the north direction may be determined by using an electronic compass based on a magnetometer and an acceleration. The electronic compass may be susceptible to an interference of a surrounding magnetic field. If the included angle between the orientation of the terminal device 130 and the north direction determined by the electronic compass does not drift, the included angle may be considered as the heading direction of the subject. If the included angle between the orientation of the terminal device 130 and the north direction determined by electronic compass drifts, which may indicate that there is a magnetic field interference, the heading direction may be determined by integrating the angular velocity obtained from the IMU data based on the heading direction obtained last time without the magnetic field interference.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 920 may be omitted.

Figure 10:
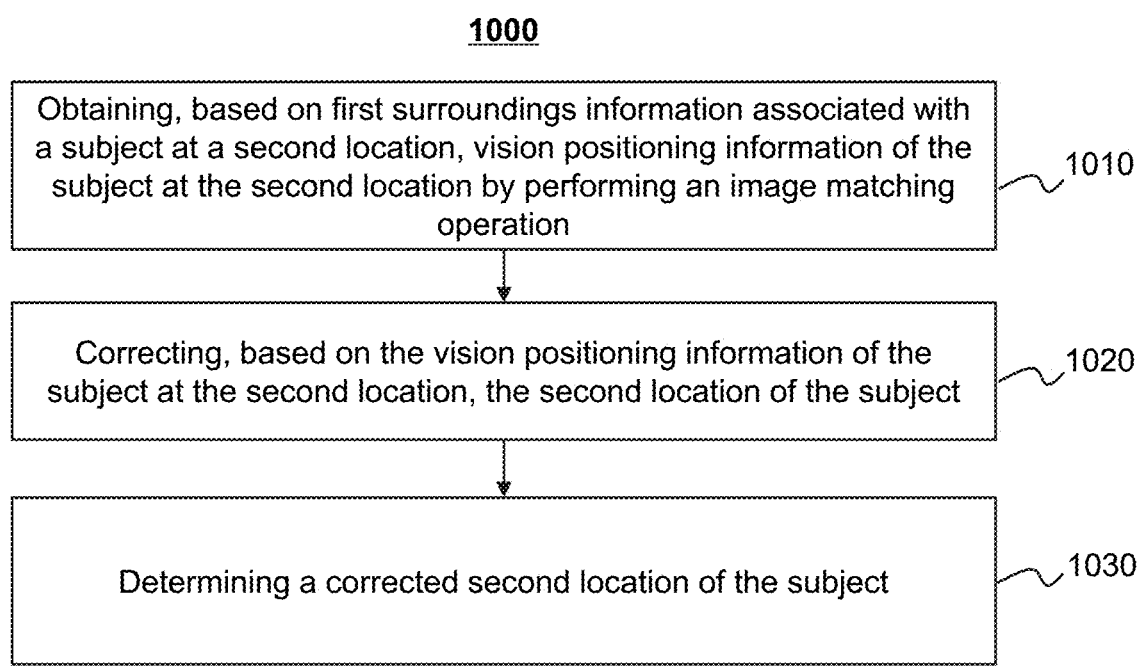
FIG. 10 is a flowchart illustrating an exemplary process for determining corrected second location of a subject according to some embodiments of the present disclosure.

FIG. 10 is a flowchart illustrating an exemplary process for determining corrected second location of a subject according to some embodiments of the present disclosure. The process 1000 may be executed by the positioning system 100. For example, the process 1000 may be implemented as a set of instructions stored in the storage. The processor 210 and/or the modules in FIG. 7 may execute the set of instructions, and when executing the instructions, the processor 210 and/or the modules may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process 1000 as illustrated in FIG. 10 and described below is not intended to be limiting. In some embodiments, the process 1000 may be performed by the correction module 750.

In 1010, the processing engine 112 (e.g., the correction module 750) may obtain vision positioning information of a subject at the second location based on first surroundings information associated with the subject at the second location by using an image matching technique.

For example, the first surroundings information associated with the subject at the second location may be obtained via a camera installed in the terminal device 130. The vision positioning information of the subject at the second location may be obtained by using a vision positioning technique. For example, the subject may capture one or more images of a signboard or a billboard of a certain store (or other building) at the second location via the camera of the terminal device 130. The one or more images may be transmitted to the correction module 750. The correction module 750 may retrieve an indoor space model from the storage device 140. The correction module 750 may determine the vision positioning information of the subject at the second location based on the one or more images and the indoor space model by using an image matching algorithm (e.g., a SIFT, a SURF, a Harris, a SUSAN). Additionally or alternatively, an estimated location of the subject at the second location may be determined based on second surroundings information, such as a WiFi signal strength of a certain store, a sound volume of the advertisement of the certain store, a distance from the second location of the subject to the location of the certain store. The estimated location of the subject at the second location may represent the relative location of the subject at the second location with respect to a reference object (e.g., the certain store). More descriptions may be found elsewhere in the present disclosure (e.g., FIG. 7 and the descriptions thereof).

For brevity, the vision positioning information of the subject at the second location may be also referred to as a candidate location of the subject. The candidate location of the subject and the second location of the subject may denote different representations of a same geographical position of the subject in the real world.

In 1020, the processing engine 112 (e.g., the correction module 750) may correct the second location of the subject based on the candidate location of the subject. In some embodiments, a distance threshold for the distance from the first location to the second location may be set. The correction module 750 may determine the corrected second location of the subject based on the candidate location of the subject, the second location of the subject, and the distance threshold.

In 1030, the processing engine 112 (e.g., the correction module 750) may determine a corrected second location of the subject. For example, the correction module 750 may select a location from the candidate location of the subject and the second location of the subject, as the corrected second location of the subject. For example, the correction module 750 may select a location whose distance to the first location is closer to the distance threshold as the corrected second location of the subject. In some embodiments, the distance threshold may be related to a step length of the subject. An average step length of an adult may be in a range of 0.8 m~1.2 m. The distance threshold may be set to be in a range of 0.6 m~1.5 m, to include the range of the step length of the subject. For illustration purpose, a first horizontal distance from the first location to the candidate location of the subject in a two-dimensional space is 2.2 m and a second horizontal distance from the first location to the second location determined based on a PDR based technique in the two-dimensional space is 1.6 m. Assuming that the distance threshold is set in the range of 0.6 m~1.5 m, the first horizontal distance (i.e., 2.2 m) is greater than the upper limit of the distance threshold, which may indicate that the subject cannot cross the first horizontal distance (e.g., 2.2 m) in one step. In contrast, the second horizontal distance (i.e., 1.6 m) is closer to the distance threshold, which may indicate that the subject is more likely to cross the second horizontal distance (e.g., 1.6 m) in one step. In this case, the corrected second location of the subject is same as the second location of the subject.

In some embodiments, a confidence level relating to the first surroundings information associated with the subject at the second location may be determined. In some embodiments, assuming that the distance threshold is related to one step length, if the first horizontal distance is greater than the upper limit of the distance threshold, which may indicate that the subject cannot cross the first horizontal distance in one step, the confidence level relating to the first surroundings information associated with the subject at the second location may be relatively low. If the first horizontal distance is closer to the distance threshold or in the range of the distance threshold, which may indicate that the subject can cross the first horizontal distance in one step, the confidence level relating to the first surroundings information associated with the subject at the second location may be relatively high. In some embodiments, if the confidence level relating to the first surroundings information associated with the subject at the second location is relatively high, the second location may be corrected based on the first surroundings information (e.g., the image in the viewing angle of the subject at the second location). For example, if the confidence level relating to the first surroundings information associated with the subject at the second location is relatively high, the candidate location of the subject determined based on the first surroundings information (e.g., the image in the viewing angle of the subject at the second location) associated with the subject at the second location may be determined as the corrected second location of the subject.

As another example, the estimated location of the subject may be determined based on the second surroundings information including WiFi signal strength of the certain store, the sound volume of the advertisement of the certain store, or the distance from the second location of the subject to the location of the certain store. Additionally, the candidate location of the subject may be determine based on the location of the certain store and the estimated location of the subject. A third horizontal distance from the first location to the candidate location in the two-dimensional space may be determined. Assuming that the distance threshold is related to the step length, if the third horizontal distance is greater than the distance threshold, which may indicate that the subject cannot cross the third horizontal distance in one step, the confidence level relating to the second surroundings information (e.g., the WiFi signal strength of the certain store, the sound volume of the advertisement of the certain store, the distance from the second location of the subject to the location of the certain store) associated with the subject at the second location may be relatively low. If the third horizontal distance is closer to the distance threshold or in the range of the distance threshold, which may indicate that the subject can cross the third horizontal distance in one step, the confidence level relating to the second surroundings information (e.g., the WiFi signal strength of the certain store, the sound volume of the advertisement of the certain store, the distance from the second location of the subject to the location of the certain store) associated with the subject at the second location may be relatively high. When the confidence level relating to the second surroundings information (e.g., the WiFi signal strength of the certain store, the sound volume of the advertisement of the certain store, the distance from the second location of the subject to the location of the certain store) associated with the subject at the second location is relatively high, the second location may be corrected based on the second surroundings information (e.g., the WiFi signal strength of the certain store, the sound volume of the advertisement word of the certain store, the distance from the second location of the subject to the location of the certain store). For example, if the confidence level relating to the second surroundings information (e.g., the WiFi signal strength of the certain store, the sound volume of the advertisement of the certain store, the distance from the second location of the subject to the location of the certain store) associated with the subject at the second location is relatively high, the candidate location of the subject determined based on the second surroundings information (e.g., the WiFi signal strength of the certain store, the sound volume of the advertisement of the certain store, the distance from the second location of the subject to the location of the certain store) associated with the subject at the second location may be determined as the corrected second location of the subject.

As still another example, if the candidate location of the subject determined according to the second surroundings information (e.g., the WiFi signal strength of the certain store, the sound volume of the advertisement of the certain store, the distance from the second location of the subject to the location of the certain store) is same as or similar to the candidate location of the subject determined according to the first surrounding information (e.g., the image in the viewing angle of the subject at the second location), it may indicate that the confidence level relating to the surroundings information (including the first surroundings information and the second surroundings information) associated with the subject at the second location is relatively high. Then, the second location may be corrected based on the candidate location of the subject. For example, if the confidence level relating to the surroundings information (including the first surroundings information and the second surroundings information) associated with the subject at the second location is relatively high, the candidate location determined according to the first/second surroundings information may be determined as the corrected second location of the subject.

As still another example, the correction module 750 may determine a specific store around the second location of the subject at the second location in the indoor space model. If the first surroundings information (e.g., the image in the viewing angle of the subject at the second location) includes the specific store, the confidence level relating to the first surroundings information associated with the subject at the second location may be relatively high. Otherwise, the confidence level relating to the first surroundings information associated with the subject at the second location may be relatively low.

In some embodiments, the correction module 750 may determine a confidence level threshold. In response to a determination that the confidence level relating to the surroundings information associated with the subject at the second location is greater than the confidence level threshold, a location (e.g., the estimated location, the candidate location) determined based on the surroundings information (e.g., the first surroundings information, the second surroundings information) associated with the subject at the second location may be determined as the corrected second location of the subject. Otherwise, the surroundings information associated with the subject at the second location may not be used to correct the second location of the subject. In some embodiments, after the second location of the subject is corrected by using the surroundings information, the terminal device 130 may send a prompt information. For example, the terminal device 130 may send a voice prompt such as "the location is corrected". As another example, the terminal device 130 may make a special mark for the corrected second location on the interface of the terminal device 130.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 11:
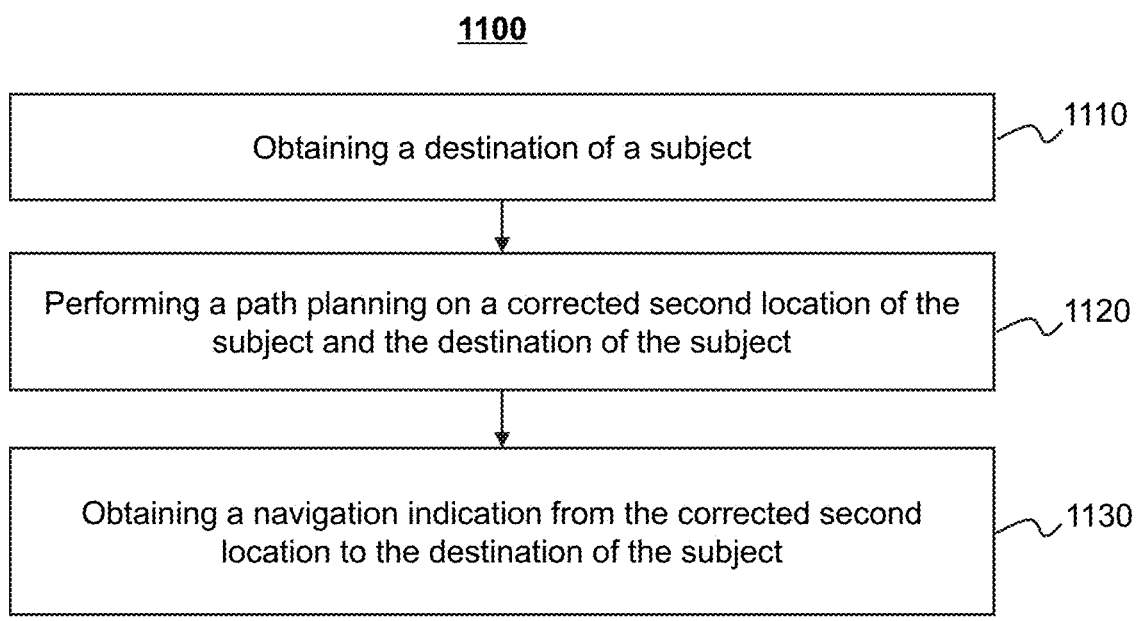
FIG. 11 is a flowchart illustrating an exemplary process for determining a navigation indication of a subject according to some embodiments of the present disclosure.

FIG. 11 is a flowchart illustrating an exemplary process for determining a navigation indication of a subject according to some embodiments of the present disclosure. The process 1100 may be executed by the positioning system 100. For example, the process 1100 may be implemented as a set of instructions stored in the storage 220. The processor 210 and/or the modules in FIG. 7 may execute the set of instructions, and when executing the instructions, the processor 210 and/or the modules may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process 1100 as illustrated in FIG. 11 and described below is not intended to be limiting. In some embodiments, process 1100 may be performed by a navigation module.

In 1110, the processing engine 112 (e.g., the navigation module) may obtain a destination of a subject. For example, the subject may input the destination via the terminal device 130.

In 1120, the processing engine 112 (e.g., the navigation module) may perform a path planning operation on a corrected second location of the subject and the destination of the subject. Exemplary path planning operation may include a heuristic map search algorithm, an A* search algorithm, a dynamic programming algorithm, a generalized Voronoi diagram algorithm, a D* algorithm, an artificial potential field method, a genetic algorithm, or the like, or a combination thereof.

In 1130, the processing engine 112 (e.g., the navigation module) may obtain a navigation indication from the corrected second location to the destination of the subject.

In some embodiments, the navigation path may be displayed based on an AR technology. The AR technology may provide the path along with an image in the viewing angle of the subject. An arrow indicating a direction of the navigation path may also be drawn on the path.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 12:
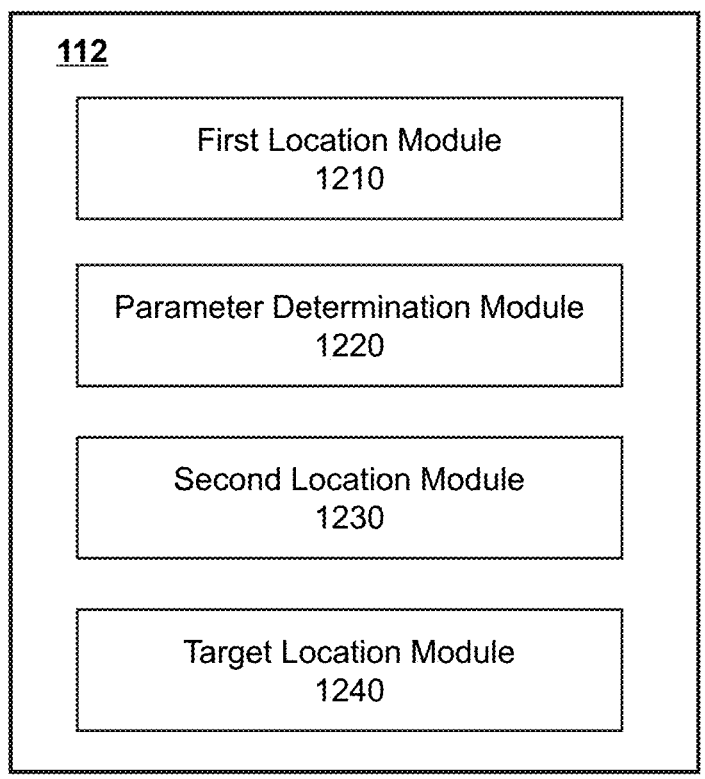
FIG. 12 is a block diagram illustrating an exemplary processing engine according to some embodiments of the present disclosure.

FIG. 12 is a block diagram illustrating an exemplary processing engine according to some embodiments of the present disclosure. The processing engine 112 may include a first location module 1210, a parameter determination module 1220, a second location module 1230, and a target location module 1240.

The first location module 1210 may be configured to obtain a first location of a subject at a first time point. In some embodiments, the first location module 1210 may obtain the first location (e.g., longitudinal and latitudinal coordinates) of the subject from one or more components of the positioning system 100. For example, the subject may carry the one or more sensors with positioning function, and the first location module 1210 may obtain the first location of the subject from the one or more sensors. Specifically, the first location module 1210 may obtain the first location of the subject via a GPS device and/or an inertial measurement unit (IMU) sensor mounted on the terminal device 130.

The parameter determination module 1220 may be configured to determine one or more motion parameters associated with the subject. The one or more motion parameters may include a step length, a step count, a heading direction, or the like. In some embodiments, the parameter determination module 1220 may determine the one or more motion parameters associated with the subject at least based on one or more sensors (e.g., the GPS device, the IMU sensor, a geomagnetic sensor, a pressure sensor) carried by the subject. For example, the parameter determination module 1220 may determine the one or more motion parameters associated with the subject based on data obtained from the one or more sensors according to one or more algorithms as described elsewhere in the present disclosure.

The second location module 1230 may be configured to determine a second location of the subject at a second time point after the first time point. In some embodiments, the second location module 1230 may determine the second location of the subject at the second time point based on the first location of the subject and the one or more motion parameters associated with the subject according to a PDR algorithm.

The target location module 1240 may be configured to determine a target location of a subject. In some embodiments, the target location module 1240 may determine the target location of the subject by adjusting the second location of the subject based on surroundings information associated with the subject at the second time point. For example, the target location module 1240 may determine a candidate location of the subject at the second time point. The target location module 1240 may determine the target location of the subject based on the second location, the candidate location, and a confidence level relating to the surroundings information associated with the subject. The candidate location of the subject and the second location of the subject may denote different representations of a position of the subject in the real world at the second time point.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, the processing engine 112 may further include a navigation module. The navigation module may be configured to determine a path from the target location of the subject to a destination of the subject. For example, the navigation module may determine at least one direction of the path from the target location of the subject to the destination of the subject. The navigation module may display an arrow indicating the direction of the path from the target location of the subject to the destination of the subject, on an interface of the terminal device 130.

Figure 13:
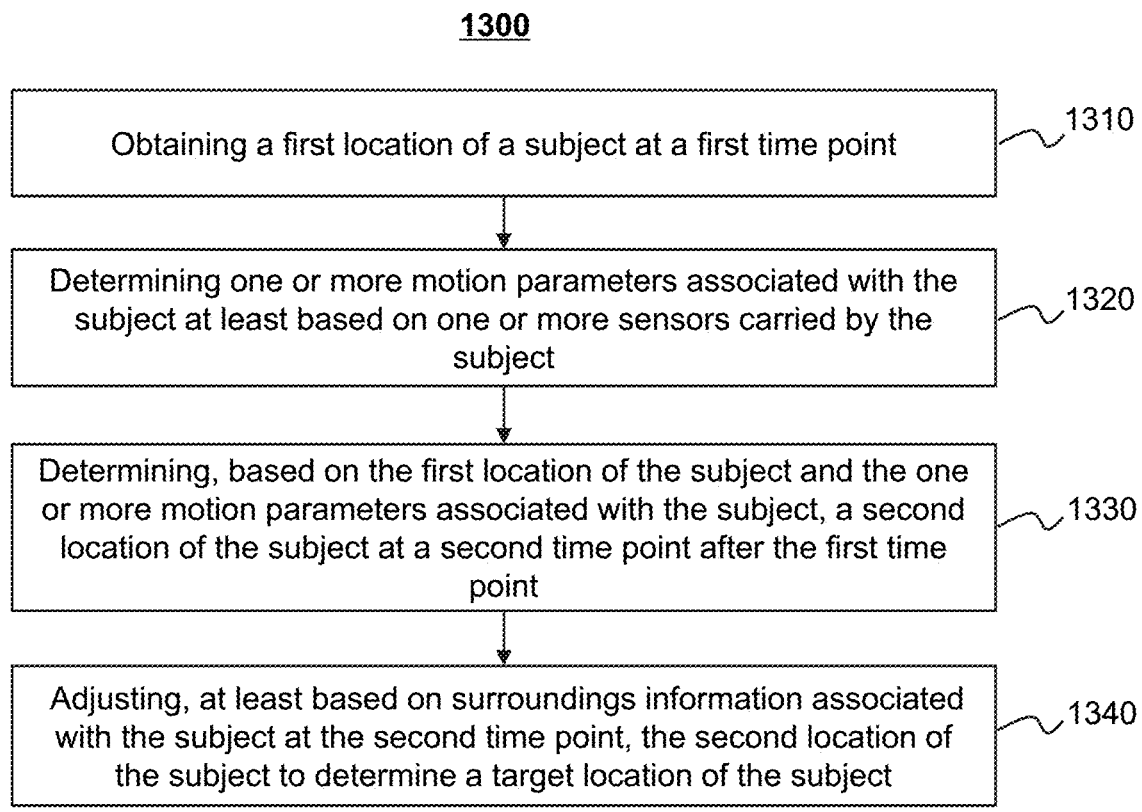
FIG. 13 is a flowchart illustrating an exemplary process for indoor positioning according to some embodiments of the present disclosure.

FIG. 13 is a flowchart illustrating an exemplary process for indoor positioning according to some embodiments of the present disclosure. The process 1300 may be executed by the positioning system 100. For example, the process 1300 may be implemented as a set of instructions stored in the storage 220. The processor 210 and/or the modules in FIG. 12 may execute the set of instructions, and when executing the instructions, the processor 210 and/or the modules may be configured to perform the process 1300. The operations of the illustrated process presented below are intended to be illustrative. In some embodiments, the process 1300 may be accomplished with one or more additional operations not described and/or without one or more of the operations discussed. Additionally, the order in which the operations of the process 1300 as illustrated in FIG. 13 and described below is not intended to be limiting.

In 1310, the processing engine 112 (e.g., the first location module 1210) may obtain a first location of a subject at a first time point.

The subject may be any composition of organic and/or inorganic matters that are with or without life and located on earth. In some embodiments, the subject may be a user (e.g., a pedestrian) or a device using an indoor positioning service via the position system 100.

In some embodiments, the first location of the subject may be a geographic location (e.g., longitudinal and latitudinal coordinates) where the subject locates at the first time point. In some embodiments, the processing engine 112 may obtain the geographic location of the subject from one or more components of the positioning system 100. For example, the subject may carry one or more sensors with positioning function, and the processing engine 112 may obtain the geographic coordinates of the subject from the one or more sensors. Specifically, the processing engine 112 may obtain the geographic coordinates of the subject via a GPS device and/or an inertial measurement unit (IMU) sensor mounted on the terminal device 130 carried by the subject. In some embodiments, the first location of the subject may be determined by an image matching operation. The image matching operation may compare at least one visual image captured by the subject at the first time point with a plurality of pre-obtained images in the database. The pre-obtained images may be captured at different positions in an indoor space, thereby each corresponding to a specific location in the indoor space. If the at least one visual image captured by the subject at the first time point matches with one of the pre-obtained images, the specific location of the matched pre-obtained image may be regarded as or nearby the first location of the subject at the first time point.

The processing engine 112 may continuously or periodically obtain the geographic coordinates of the subject from the one or more sensors (e.g., the GPS device). Additionally or alternatively, the sensor with positioning function (e.g., the GPS device) may transmit the geographic coordinates of the subject to a storage device (e.g., the storage device 140) of the positioning system 100 via the network 150 continuously or periodically. The processing engine 112 may access the storage device and retrieve one or more geographic coordinates of the subject.

In 1320, the processing engine 112 (e.g., the parameter determination module 1220) may determine one or more motion parameters associated with the subject at least based on one or more sensors carried by the subject.

In some embodiments, the one or more motion parameters associated with the subject may include a step length, a step count, a heading direction, or the like. As used herein, "a step length of a subject (e.g., a user)" may refer to a distance between corresponding points of successive heel contact of the opposite feet. "A step count of a subject" may refer to a number (or count) of steps of the subject in a certain time period. "A heading direction of a subject" may refer to a direction that the subject is facing during a movement. In some embodiments, the heading direction of the subject may be measured in degrees clockwise from true north.

The processing engine 112 may determine the one or more motion parameters associated with the subject based on data obtained from the one or more sensors. The one or more sensors may include the GPS device, the IMU sensor, a geomagnetic sensor, a pressure sensor, or the like, or any combination thereof. In some embodiments, the one or more sensors may be installed in a terminal device (e.g., the terminal device 130) of the subject. In some embodiments, the one or more sensors may be directly attached to one or more portions of the subject. For example, the IMU sensor may be attached to a wrist or an ankle of the subject. More descriptions of the determination of the one or more motion parameters associated with the subject may be found elsewhere in the present disclosure (e.g., FIGS. 6, 9, and the descriptions thereof).

In 1330, the processing engine 112 (e.g., the second location module 1230) may determine, based on the first location of the subject and the one or more motion parameters associated with the subject, a second location of the subject at a second time point after the first time point.

As used herein, the second location of the subject may be a first representation of the geographic location (e.g., longitudinal and latitudinal coordinates) where the subject locates at the second time point. In some embodiments, the processing engine 112 may determine the second location of the subject at the second time point based on the first location of the subject and the one or more motion parameters associated with the subject, by using a pedestrian dead reckoning (PDR) algorithm. The dead reckoning may refer to a process of calculating one's current position by using a previously determined position, and advancing that position based upon known or estimated speeds over elapsed time. For example, the processing engine 112 may determine the second location of the subject based on the first location of the subject and the one or more motion parameters associated with the subject according to Equation (2) and Equation (3) as described above. More descriptions of the determination of the second location of the subject by using the PDR algorithm may be found elsewhere in the present disclosure (e.g., FIGS. 6, 9, and the descriptions thereof).

In 1340, the processing engine 112 (e.g., the target location module 1240) may adjust, at least based on surroundings information associated with the subject at the second time point, the second location of the subject to determine a target location of the subject.

As used herein, the target location of the subject may be a second representation of the geographic location (e.g., longitudinal and latitudinal coordinates) where the subject locates at the second time point. The target location of the subject may also be referred to as the adjusted (or corrected) second location of the subject at the second time point. The surroundings information may include visual information, voice information, distance information, or the like, or any combination thereof. For example, the surroundings information may include an image in the viewing angle of the subject, a WiFi signal strength of a certain store, a sound volume of the advertisement of the certain store, a distance from the second location of the subject to a location of the certain store, or the like, as described elsewhere in the present disclosure (e.g., FIGS. 7, 10, and descriptions thereof).

In some embodiments, the processing engine 112 may adjust the second location of the subject based on the surroundings information associated with the subject at the second time point according to a vision positioning technique. For example, the processing engine 112 may obtain one or more images from one or more image capturing devices (e.g., a camera) carried by the subject. The processing engine 112 may extract one or more features associated with the one or more images according to a voice recognition algorithm, and/or a feature extraction algorithm. The one or more features associated with the image may include a voice feature, a color feature, a texture feature, a shape feature, a spatial relationship feature, or the like, or any combination thereof. The processing engine 112 may determine, based on the one or more features associated with the one or more images, the surroundings information associated with the subject. In some embodiments, the surroundings information associated with the subject may be regarded to include the one or more features associate with the one or more images.

The processing engine 112 may adjust the second location of the subject based on the surroundings information associated with the subject to determine the target location of the subject. In some embodiments, the processing engine 112 may determine a candidate location of the subject at the second time point based on the surroundings information associated with the subject. For example, the processing engine 112 may determine pose information associated with the one or more image capturing devices based on the surroundings information associated with the subject and the one or more motion parameters associated with the subject. As used herein, "pose information associated with an image capturing device" may refer to a position and/or an orientation of the image capturing device in a world coordinate system. The processing engine 112 may determine the candidate location of the subject based on the pose information associated with the one or more capturing devices. More descriptions of the determination of the candidate location of the subject based on the pose information associated with the one or more image capturing devices may be found elsewhere in the present disclosure (e.g., FIGS. 4, 10, and the descriptions thereof).

In some embodiments, the processing engine 112 may optimize the pose information associated with the one or more capturing devices by performing a loop detection. For example, the processing engine 112 may determine a similarity between at least one of the one or more images and a pre-obtained image by performing an image matching operation. The processing engine 112 may determine that a closed loop is formed in response to a determination that the similarity between the at least one of the one or more images and the pre-obtained image is greater than a preset threshold. In some embodiments, a plurality of pre-obtained images and a location corresponding to each of the plurality of pre-obtained images may be stored in a storage device (e.g., the storage device 140) of the positioning system 100 or an external storage device. When the closed loop is formed, the processing engine 112 may access the storage device and retrieve a location corresponding to the pre-obtained image. The processing engine 112 may determine the location corresponding to the pre-obtained image as the candidate location of the subject at the second time point.

The processing engine 112 may determine the target location of the subject based on the second location of the subject, the candidate location of the subject, and a confidence level relating to the surroundings information associated with the subject. As used herein, "a confidence level relating to the surroundings information associated with a subject at a specific time point" may refer to the reliability of the surroundings information in the determination of the location of the subject at the specific time point. In some embodiments, the processing engine 112 may determine the confidence level relating to the surroundings information associated with the subject, based on the one or more motion parameters associated with the subject as described elsewhere in the present disclosure (e.g., FIG. 10, and the descriptions thereof).

In some embodiments, the processing engine 112 may determine whether the confidence level is greater than a preset threshold. In response to a determination that the confidence level is greater than the preset threshold, the processing engine 112 may determine the candidate location of the subject as the target location of the subject at the second time point. In response to a determination that the confidence level is not greater than the preset threshold, the processing engine 112 may determine the second location of the subject as the target location of the subject at the second time point.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiment, one or more operations may be added or omitted in the process 1300. For example, a navigation operation may be added after the operation 1340. In some embodiments, the processing engine 112 (e.g., a navigation module) may obtain a destination of the subject. For example, the subject (e.g., the user) may input the destination via the terminal device 130. The processing engine 112 may determine a path from the target location of the subject to the destination of the subject. For example, the processing engine 112 may determine the path from the target location of the subject to the destination of the subject by using one or more path planning algorithms as described elsewhere in the present disclosure. In some embodiments, the processing engine 112 may determine at least one direction of the path from the target location of the subject to the destination of the subject. The processing engine 112 may display an arrow indicating the direction of the path from the target location of the subject to the destination of the subject. For example, the processing engine 112 may display the arrow on an interface of the terminal device 130.

In some embodiments, the processing engine 112 may establish a multiple-dimensional coordinate system (e.g., a three-dimensional coordinate system, an indoor environment map as described elsewhere in the present disclosure) based on one or more pre-obtained images. The processing engine 112 may determine coordinates of the first location, the second location, the target location, and the destination of the subject in the multiple-dimensional coordinate system.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for indoor positioning, implemented on a computing device having an interface, at least one storage device storing a set of instructions, and at least one processor in communication with the at least one storage device, the method comprising:
   determining, by a vision positioning unit or a satellite positioning unit, a first location of a subject at a first time point;

determining, by one or more sensors including an inertial measurement unit (IMU) sensor, one or more motion parameters associated with the subject, wherein the one or more motion parameters associated with the subject at least include a heading direction;

determining, by the at least one processor, based on the first location of the subject and the one or more motion parameters associated with the subject, a second location of the subject at a second time point after the first time point;

obtaining, by a camera, surroundings information associated with the subject at the second time point, wherein the surroundings information at least includes visual information;

determining, by the at least one processor, based on the one or more motion parameters associated with the subject and pose information associated with the surroundings information at the second time point, a confidence level relating to the surroundings information associated with the subject, wherein the pose information at least reflects a real time position and orientation of the subject that carries the camera;

determining, by the at least one processor, a target location of the subject by adjusting, at least based on the confidence level relating to the surroundings information associated with the subject and a confidence level threshold, the second location of the subject;

determining, by the at least one processor, a path from the target location of the subject to a destination of the subject;

determining, by the at least one processor, at least one arrow indicating a direction of the path from the target location to the destination; and displaying a combination of the at least one arrow and the path from the target location to the destination on an augmented reality (AR) based real-time navigation interface.

2. The method of claim 1, wherein the one or more motion parameters associated with the subject further include at least one of a step length or a step count.

3. The method of claim 1, wherein determining, based on the first location of the subject and the one or more motion parameters associated with the subject, the second location of the subject at the second time point comprises:
determining the second location of the subject by using a pedestrian dead reckoning (PDR) algorithm.

4. The method of claim 1, wherein the determining, by the at least one processor, based on the one or more motion parameters associated with the subject and pose information associated with the surroundings information at the second time point, a confidence level relating to the surroundings information associated with the subject comprises:
obtaining one or more images from the camera carried by the subject;
extracting one or more features associated with the one or more images;
determining, based on the one or more features associated with the one or more images, the surroundings information associated with the subject;
determining, based on the surroundings information associated with the subject and the one or more motion parameters associated with the subject, pose information associated with the camera; and
determining, based on the one or more motion parameters associated with the subject and the pose information associated with the surroundings information at the second time point, the confidence level relating to the surroundings information associated with the subject.

5. The method of claim 4, further comprising:
optimizing the pose information associated with the camera by performing a loop detection.

6. The method of claim 5, further comprising:
determining a similarity between at least one of the one or more images and a pre-obtained image; and
determining that a closed loop is formed in response to a determination that the similarity between the at least one of the one or more images and the pre-obtained image is greater than a preset threshold.

7. The method of claim 1, wherein the one or more sensors further include at least one of a geomagnetic sensor or a pressure sensor.

8. The method of claim 1, further comprising:
establishing a multiple-dimensional coordinate system based on one or more pre-obtained images; and
determining coordinates of at least one of the first location, the second location, the target location, or the destination of the subject in the multiple-dimensional coordinate system.

9. The method of claim 1, wherein the pose information includes an absolute pose that corresponds to an initial location of the subject or a relative pose that corresponds to a relative location with respect to the initial location of the subject.

10. The method of claim 9, further comprising:
updating, based on the relative pose between adjacent images obtained by the image capturing devices, the real time position of the subject.

11. The method of claim 1, wherein determining, by the at least one processor, a target location of the subject by adjusting, at least based on the confidence level relating to the surroundings information associated with the subject and a confidence level threshold, the second location of the subject comprises:
determining a candidate location of the subject at the second time point based on the surroundings information associated with the subject;
comparing the confidence level relating to the surroundings information associated with the subject with the confidence level threshold;
determining the candidate location as the target location of the subject at the second time point in response to a determining that the confidence level relating to the surroundings information associated with the subject is greater than the confidence level threshold; and
determining the second location as the target location of the subject at the second time point in response to a determining that the confidence level relating to the surroundings information associated with the subject is equal to or smaller than the confidence level threshold.

12. The method of claim 11, wherein
the confidence level relating to the surroundings information associated with the subject is related to a distance from the first location to the candidate location and a step length.

13. A system for indoor positioning, comprising:
an interface;
at least one storage medium storing a set of instructions;
at least one processor in communication with the at least one storage medium, when executing the stored set of instructions, the at least one processor causes the system to:

determine, by a vision positioning unit or a satellite positioning unit, a first location of a subject at a first time point;

determine, by one or more sensors including an inertial measurement unit (IMU) sensor, one or more motion parameters associated with the subject, wherein the one or more motion parameters associated with the subject include at least a heading direction;

determine, by the at least one processor, based on the first location of the subject and the one or more motion parameters associated with the subject, a second location of the subject at a second time point after the first time point;

obtain, by a camera, surroundings information associated with the subject at the second time point, wherein the surroundings information at least includes visual information;

determine, by the at least one processor, based on the one or more motion parameters associated with the subject and pose information associated with the surroundings information at the second time point, a confidence level relating to the surroundings information associated with the subject, wherein the pose information at least reflects a real time position and orientation of the subject that carries the camera;

determine, by the at least one processor, a target location of the subject by adjusting, at least based on the confidence level relating to the surroundings information associated with the subject and a confidence level threshold, the second location of the subject;

determine, by the at least one processor, a path from the target location of the subject to a destination of the subject;

determine, by the at least one processor, at least one arrow indicating a direction of the path from the target location to the destination; and display a combination of the at least one arrow and the path from the target location to the destination on an augmented reality (AR) based real-time navigation interface.

14. The system of claim 13, wherein to determine, by the at least one processor, based on the one or more motion parameters associated with the subject and the pose information associated with the surroundings information at the second time point, the confidence level relating to the surroundings information associated with the subject, the at least one processor causes the system to:

obtain one or more images from the camera carried by the subject;

extract one or more features associated with the one or more images;

determine, based on the one or more features associated with the one or more images, the surroundings information associated with the subject;

determine, based on the surroundings information associated with the subject and the one or more motion parameters associated with the subject, pose information associated with the camera; and determine, based on the one or more motion parameters associated with the subject and the pose information associated with the surroundings information at the second time point, the confidence level relating to the surroundings information associated with the subject.

15. The system of claim 14, the at least one processor causes the system to:

optimize the pose information associated with the camera by performing a loop detection.

16. The system of claim 15, the at least one processor causes the system to:

determine a similarity between at least one of the one or more images and a pre-obtained image; and determine that a closed loop is formed in response to a determination that the similarity between the at least one of the one or more images and the pre-obtained image is greater than a preset threshold.

17. The system of claim 13, wherein to determine, by the at least one processor, a target location of the subject by adjusting, at least based on the confidence level relating to the surroundings information associated with the subject and a confidence level threshold, the second location of the subject, the at least one processor causes the system to:

determine a candidate location of the subject at the second time point based on the surroundings information associated with the subject;

compare the confidence level relating to the surroundings information associated with the subject with the confidence level threshold;

determine the candidate location as the target location of the subject at the second time point in response to a determining that the confidence level relating to the surroundings information associated with the subject is greater than the confidence level threshold; and determine the second location as the target location of the subject at the second time point in response to a determining that the confidence level relating to the surroundings information associated with the subject is equal to or smaller than the confidence level threshold.

18. The system of claim 13, wherein the one or more motion parameters associated with the subject further include at least one of a step length or a step count.

19. The system of claim 13, wherein to determine, based on the first location of the subject and the one or more motion parameters associated with the subject, the second location of the subject at the second time point, the at least one processor causes the system to:

determining the second location of the subject by using a pedestrian dead reckoning (PDR) algorithm.

20. The system of claim 13, wherein the one or more sensors further include at least one of a geomagnetic sensor or a pressure sensor.

* * * * *